US008140976B2

(12) United States Patent
Bohn et al.

(10) Patent No.: US 8,140,976 B2
(45) Date of Patent: Mar. 20, 2012

(54) USING CONTENT AGGREGATION TO BUILD ADMINISTRATION CONSOLES

(75) Inventors: Joseph A. Bohn, Durham, NC (US); Kathryn H. Britton, Chapel Hill, NC (US); Samar Choudhary, Morrisville, NC (US); Donald F. Ferguson, Yorktown Heights, NY (US); Carol A. Jones, Raleigh, NC (US); Richard A. King, Cary, NC (US); Jason R. McGee, Apex, NC (US); Christopher C. Mitchell, Raleigh, NC (US); Vijay Pandiarajan, Morrisville, NC (US); Douglas R. Petty, Rochester, MN (US); Elizabeth A Schreiber, Cary, NC (US); Timothy G. Shortley, Raleigh, NC (US); Shikha Srivastava, Cary, NC (US); John W. Sweitzer, Austin, TX (US); Robert T. Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 12/258,455

(22) Filed: Oct. 27, 2008

(65) Prior Publication Data

US 2009/0044152 A1 Feb. 12, 2009

Related U.S. Application Data

(63) Continuation of application No. 10/795,008, filed on Mar. 5, 2004, now Pat. No. 7,493,563.

(51) Int. Cl.
*G06F 15/16* (2006.01)
*G06F 15/177* (2006.01)

(52) U.S. Cl. ........ 715/736; 715/738; 709/218; 709/222; 709/224

(58) Field of Classification Search .................. 715/736, 715/738; 709/218, 222, 224
See application file for complete search history.

(56) References Cited

U.S. PATENT DOCUMENTS

| | | | |
|---|---|---|---|
| 5,361,361 | A | 11/1994 | Hickman et al. |
| 5,893,916 | A | 4/1999 | Dooley |
| 6,011,537 | A | 1/2000 | Slotznick |
| 6,043,816 | A | 3/2000 | Williams et al. |
| 6,049,799 | A | 4/2000 | Mangat et al. |
| 6,219,700 | B1 | 4/2001 | Chang et al. |
| 6,240,410 | B1 | 5/2001 | Wical |
| 6,256,668 | B1 | 7/2001 | Slivka et al. |

(Continued)

OTHER PUBLICATIONS

Joseph A. Bohn et al., U.S. Appl. No. 10/795,007, filed Mar. 5, 2004, Office Action, Jun. 5, 2007, 11 pages.

(Continued)

*Primary Examiner* — Tadeese Hailu
*Assistant Examiner* — Haoshian Shih
(74) *Attorney, Agent, or Firm* — Marcia L. Doubet

(57) ABSTRACT

Content aggregation is used to build administration consoles. Preferred embodiments enable providing a solution-based approach to information technology ("IT") administration, whereby content can be flexibly arranged to provide a content view that is adapted for the IT solution deployed in a particular IT environment. In preferred embodiments, portal technology is used for the aggregation framework, and portlets are used for creating content. Alternatively, other approaches such as struts and tiles may be used. Preferred embodiments deploy an administration console as a Web-accessible application, and this console consolidates the administration interfaces for an arbitrary set of management operations, including administration of an arbitrary collection of hardware and/or software resources. Roles/permissions may be used when rendering content for the console, thereby customizing a view to individual end users (or user groups).

6 Claims, 37 Drawing Sheets

U.S. PATENT DOCUMENTS

| | | | |
|---|---|---|---|
| 6,281,900 | B1 | 8/2001 | Ishikawa |
| 6,353,446 | B1 | 3/2002 | Vaughan et al. |
| 6,510,466 | B1 | 1/2003 | Cox et al. |
| 6,563,514 | B1 | 5/2003 | Samar |
| 6,573,906 | B1 | 6/2003 | Harding |
| 6,584,496 | B1 | 6/2003 | Ludtke |
| 6,621,505 | B1 | 9/2003 | Beauchamp et al. |
| 6,799,198 | B1 | 9/2004 | Huboi et al. |
| 6,801,222 | B1 | 10/2004 | Dunham et al. |
| 6,820,094 | B1 | 11/2004 | Ferguson et al. |
| 6,918,090 | B2 | 7/2005 | Hesmer et al. |
| 6,970,869 | B1 | 11/2005 | Slaughter et al. |
| 6,993,720 | B1 | 1/2006 | Hanoch et al. |
| 7,024,658 | B1 | 4/2006 | Cohen et al. |
| 7,028,264 | B2 | 4/2006 | Santoro et al. |
| 7,062,511 | B1 | 6/2006 | Poulsen |
| 7,072,807 | B2 | 7/2006 | Brown et al. |
| 7,203,909 | B1 | 4/2007 | Horvitz et al. |
| 7,444,633 | B2 | 10/2008 | Bohn et al. |
| 7,493,563 | B2 | 2/2009 | Bohn et al. |
| 7,783,638 | B2 | 8/2010 | Choudhary et al. |
| 7,890,864 | B2 | 2/2011 | Bartek et al. |
| 7,930,696 | B2 | 4/2011 | Bohn et al. |
| 2001/0034771 | A1 | 10/2001 | Hutsch et al. |
| 2002/0032763 | A1 | 3/2002 | Cox et al. |
| 2002/0053020 | A1 | 5/2002 | Teijido et al. |
| 2002/0054152 | A1 | 5/2002 | Palaniappan et al. |
| 2002/0063735 | A1 | 5/2002 | Tamir et al. |
| 2002/0091993 | A1 | 7/2002 | Walley et al. |
| 2002/0116454 | A1 | 8/2002 | Dyla et al. |
| 2002/0120607 | A1 | 8/2002 | Price et al. |
| 2002/0129136 | A1 | 9/2002 | Matharu |
| 2002/0143949 | A1 | 10/2002 | Rajarajan et al. |
| 2002/0146018 | A1 | 10/2002 | Kailamaki et al. |
| 2002/0147709 | A1 | 10/2002 | Rajarajan et al. |
| 2002/0149601 | A1 | 10/2002 | Rajarajan et al. |
| 2002/0158899 | A1 | 10/2002 | Raymond |
| 2002/0161876 | A1 | 10/2002 | Raymond |
| 2002/0165745 | A1 | 11/2002 | Greene et al. |
| 2002/0178254 | A1 | 11/2002 | Brittenham et al. |
| 2002/0178290 | A1 | 11/2002 | Coulthard et al. |
| 2002/0188612 | A1 | 12/2002 | Yu et al. |
| 2002/0188613 | A1 | 12/2002 | Chakraborty et al. |
| 2003/0001875 | A1 | 1/2003 | Black et al. |
| 2003/0018650 | A1 | 1/2003 | Priestley |
| 2003/0055868 | A1 | 3/2003 | Fletcher et al. |
| 2003/0055878 | A1 | 3/2003 | Fletcher et al. |
| 2003/0056026 | A1 | 3/2003 | Anuff et al. |
| 2003/0059009 | A1 | 3/2003 | Meyerson et al. |
| 2003/0065827 | A1 | 4/2003 | Skufoa et al. |
| 2003/0117437 | A1 | 6/2003 | Cook et al. |
| 2003/0126558 | A1 | 7/2003 | Griffin et al. |
| 2003/0137538 | A1 | 7/2003 | Hesmer et al. |
| 2004/0002944 | A1 | 1/2004 | Hauser et al. |
| 2004/0059705 | A1 | 3/2004 | Wittke et al. |
| 2004/0104931 | A1 | 6/2004 | Schmitt |
| 2004/0113948 | A1 | 6/2004 | Shahrbabaki et al. |
| 2004/0133660 | A1 | 7/2004 | Junghuber et al. |
| 2004/0148586 | A1 | 7/2004 | Gilboa |
| 2004/0199392 | A1 | 10/2004 | Khatri et al. |
| 2004/0230901 | A1 | 11/2004 | Godwin et al. |
| 2004/0254884 | A1 | 12/2004 | Haber et al. |
| 2005/0065913 | A1 | 3/2005 | Lillie et al. |
| 2005/0065953 | A1 | 3/2005 | Bower et al. |
| 2005/0102429 | A1 | 5/2005 | Pinhas et al. |
| 2005/0154719 | A1 | 7/2005 | Choudhary et al. |
| 2005/0154986 | A1 | 7/2005 | Bartek et al. |
| 2005/0193001 | A1 | 9/2005 | Shoham |
| 2005/0198042 | A1 | 9/2005 | Davis |
| 2005/0198196 | A1 | 9/2005 | Bohn et al. |
| 2005/0198201 | A1 | 9/2005 | Bohn et al. |
| 2005/0198648 | A1 | 9/2005 | Wray et al. |
| 2005/0246632 | A1 | 11/2005 | Guido et al. |
| 2006/0031222 | A1 | 2/2006 | Hannsmann |
| 2006/0031849 | A1 | 2/2006 | Barta et al. |
| 2006/0271844 | A1 | 11/2006 | Suldikar et al. |
| 2008/0270929 | A1 | 10/2008 | Bohn et al. |

OTHER PUBLICATIONS

Joseph A. Bohn et al., U.S. Appl. No. 10/795,007, filed Mar. 5, 2004, Office Action, Nov. 20, 2007, 14 pages.

Joseph A. Bohn et al., U.S. Appl. No. 10/795,007, filed Mar. 5, 2004, Advisory Action, Feb. 13, 2008, 3 pages.

Joseph A. Bohn et al., U.S. Appl. No. 10/795,007, filed Mar. 5, 2004, Examiner Interview Summary, Jun. 13, 2008, 1 page.

Joseph A. Bohn et al., U.S. Appl. No. 10/795,007, filed Mar. 5, 2004, Notice of Allowance, Jun. 13, 2008, 6 pages.

Joseph A. Bohn et al., U.S. Appl. No. 10/795,008, filed Mar. 5, 2004, Office Action, Jun. 1, 2007, 12 pages.

Joseph A. Bohn et al., U.S. Appl. No. 10/795,008, filed Mar. 5, 2004, Office Action, Nov. 16, 2007, 14 pages.

Joseph A. Bohn et al., U.S. Appl. No. 10/795,008, filed Mar. 5, 2004, Office Action, Apr. 9, 2008, 21 pages.

Joseph A. Bohn et al., U.S. Appl. No. 10/795,008, filed Mar. 5, 2004, Examiner Interview Summary, Jun. 23, 2008, 2 pages.

Joseph A. Bohn et al., U.S. Appl. No. 10/795,008, filed Mar. 5, 2004, Notice of Allowance, Oct. 10, 2008, 7 pages.

Velda Bartek et al., U.S. Appl. No. 10/754,375, filed Jan. 9, 2004, Office Action, Dec. 5, 2006, 13 pages.

Velda Bartek et al., U.S. Appl. No. 10/754,375, filed Jan. 9, 2004, Office Action, Apr. 16, 2007, 14 pages.

Velda Bartek et al., U.S. Appl. No. 10/754,375, filed Jan. 9, 2004, Office Action, Oct. 3, 2007, 16 pages.

Velda Bartek et al., U.S. Appl. No. 10/754,375, filed Jan. 9, 2004, Office Action, Jun. 9, 2008, 17 pages.

Velda Bartek et al., U.S. Appl. No. 10/754,375, filed Jan. 9, 2004, Examiner's Answer, Oct. 15, 2008, 18 pages.

Samar Choudhary et al., U.S. Appl. No. 10/875,971, filed Jun. 24, 2004, Office Action, Nov. 16, 2006, 10 pages.

Samar Choudhary et al., U.S. Appl. No. 10/875,971, filed Jun. 24, 2004, Office Action, May 15, 2007, 14 pages.

Samar Choudhary et al., U.S. Appl. No. 10/875,971, filed Jun. 24, 2004, Office Action, Dec. 4, 2007, 15 pages.

Samar Choudhary et al., U.S. Appl. No. 10/875,971, filed Jun. 24, 2004, Examiners Answer, Jul. 2, 2008, 18 pages.

Samar Choudhary et al., U.S. Appl. No. 10/875,971, filed Jun. 24, 2004, BPAI Decision, Jan. 25, 2010, 14 pages.

Gary T. Barta et al., U.S. Appl. No. 10/819,053, filed Apr. 6, 2004, Office Action, Jun. 26, 2009, 15 pages.

Gary T. Barta et al., U.S. Appl. No. 10/819,053, filed Apr. 6, 2004, Office Action, Nov. 27, 2009, 14 pages.

Gary T. Barta et al., U.S. Appl. No. 10/819,053, filed Apr. 6, 2004, Office Action, Mar. 17, 2011, 13 pages.

Gary T. Barta et al., U.S. Appl. No. 10/819,053, filed Apr. 6, 2004, Examiner Interview Summary, Aug. 5, 2010, 3 pages.

Gary T. Barta et al., U.S. Appl. No. 10/819,053, filed Apr. 6, 2004, Final Office Action, Oct. 15, 2010, 17 pages.

Velda Bartek et al., U.S. Appl. No. 10/754,375, filed Jan. 9, 2004, BPAI Decision, Sep. 28, 2010, 9 pages.

Velda Bartek et al., U.S. Appl. No. 10/754,375, filed Jan. 9, 2004, Notice of Allowance, Oct. 7, 2010, 6 pages.

Joseph A. Bohn et al., U.S. Appl. No. 12/168,784, filed Jul. 7, 2008, Notice of Allowance and Examiner's Interview Summary, Dec. 13, 2010, 8 pages.

Lin, Hwa-Chun et al., "Distributed Network Management by HTTP-Based Remote Invocation", Global Telecommunications Conference, Rio de Janeiro, Dec. 5-9, 1999, GLOBECOM '99: Seamless Interconnection for Universal Services (pp. 1889-1893).

Rowley, Ian, "SCADA and the Internet", SCADA towards 2001, Bi-Annual Symposium and Exhibition on SCADA, Gatwick, UK, Jun. 5, 1997, Proceedings (pp. 1-15).

Shortley, Tim et al., "Integrated Solutions Console: a unified portal for autonomic systems", IBM DeveloperWorks Live!, New Orleans, LA, Apr. 9-12, 2003 (15 pages).

"Microsoft Management Console: Overview", Microsoft Corporation, Oct. 7, 1000, printed Nov. 18, 2003, <http://www.microsoft.com/windows2000/techinfo/howitworks/management/mmcover.asp> (2 pages).

"Microsoft Management Console: Overview; White Paper", Microsoft Corporation, Redmond, WA, 1999 (55 pages).

C. S. Yang et al., "Design and Implementation of an Administration System for Distributed Web Server", Proceedings of the Twelfth Systems Administration Conference (LISA '98) Boston, MA, Dec. 6-11, 1998 (11 pages).
Budi Darmawan, et al., "IBM Tivoli Monitoring for Databases", IBM Redbooks, 2002 (208 pages).
Hansen, Tony, "On BRM Framework", Technical White Paper, Oct. 15, 2003, 89 pages.
Gary T. Barta et al., U.S. Appl. No. 10/819,053, filed Apr. 6, 2004, Office Action, Apr. 29, 2010, 18 pages.
Samar Choudhary et al., U.S. Appl. No. 10/875,971, filed Jun. 24, 2004, Notice of Allowance, Apr. 15, 2010, 6 pages.
Gary T. Barta et al., U.S. Appl. No. 10/819,053, filed Apr. 6, 2004, Office Action, Oct. 24, 2011, 12 pages.
Gary T. Barta et al., U.S. Appl. No. 10/819,053, filed Apr. 6, 2004, Advisory Action, Dec. 17, 2010, 3 pages.

```
<?xml version="1.0" encoding="UTF-8"?>
<component xmlns:xsi="http://www.w3.org/2001/XMLSchema-instance"
           xsi:noNamespaceSchemaLocation="isc.xsd"
           uid="com.ibm.isc.samples.layout.ISCRowsColumns"
           version="5.0"
           suiteID="com.ibm.isc.samples.suite"
           suiteversion="5.0.2">
  <component-title>
    <title locale="en">Layout Pages</title>
  </component-title>
  <suite-title>
    <title locale="en">Console Samples, Version 1</title>
  </suite-title>

  <content-hierarchy>
    <content-type name="workItemPage" supported-markup="html">
      <org-node uid="com.ibm.isc.samplesNode">
        <title locale="en">Samples</title>
        <org-node uid="com.ibm.isc.samplesNode.RowAndColumn">
          <title locale="en">Row and Column Layouts</title>
          <page uid="com.ibm.isc.samples.layout.row_pg">
            <title locale="en">One Row</title>
            <!--                                                -->
            <!-- This page layout has a single row.             -->
            <!--      _____                                     -->
            <!--     |     |                                    -->
            <!--     |  A  |                                    -->
            <!--     |     |                                    -->
            <!--     |_____|                                    -->
            <page-layout>
              <row>
                <portlet
                 ref="com.ibm.isc.samples.layout.A_Portlet"/>
              </row>
            </page-layout>
          </page>
```

```
<page uid="com.ibm.isc.samples.layout.column_pg">
  <title locale="en">One Column</title>
  <!--                                              -->
  <!-- This page layout has a single column.        -->
  <!--   _____                                      -->
  <!-- |       |                                    -->
  <!-- |   A   |                                    -->
  <!-- |       |                                    -->
  <!-- |_____|                                      -->
  <page-layout>
    <column>
      <portlet
       ref="com.ibm.isc.samples.layout.A_Portlet"/>
    </column>
  </page-layout>
</page>
<page uid="com.ibm.isc.samples.layout.2rows_pg">
  <title locale="en">Two Rows</title>
  <!--                                         -->
  <!-- This page layout has two rows.          -->
  <!--   _____                                 -->
  <!-- |   A   |                               -->
  <!-- |_____|                                 -->
  <!-- |   B   |                               -->
  <!-- |_____|                                 -->
  <!--                                         -->
  <page-layout>
    <column>
      <row>
        <portlet
         ref="com.ibm.isc.samples.layout.A_Portlet"/>
      </row>
      <row>
        <portlet
         ref="com.ibm.isc.samples.layout.B_Portlet"/>
      </row>
    </column>
  </page-layout>
</page>
```

```
<page uid="com.ibm.isc.samples.layout.2cols_pg">
  <title locale="en">Two Columns</title>
  <!--                                          -->
  <!-- This page layout has two columns.        -->
  <!--    _______                               -->
  <!-- |   |   |                                -->
  <!-- | A | B |                                -->
  <!-- |   |   |                                -->
  <!-- |___|___|                                -->
  <!--                                          -->
  <page-layout>
    <row>
      <column width="30%" >
        <portlet
         ref="com.ibm.isc.samples.layout.A_Portlet"/>
      </column>
      <column width="70%" >
        <portlet
         ref="com.ibm.isc.samples.layout.B_Portlet"/>
      </column>
    </row>
  </page-layout>
</page>
```

```
<page uid="com.ibm.isc.samples.layout.row2cols_pg">
  <title locale="en">Row and Two Columns</title>
  <!--                                               -->
  <!-- This page layout has two rows, with           -->
  <!--           two columns in the second row.      -->
  <!--      _______                                  -->
  <!-- |           |                                 -->
  <!-- |     A     |                                 -->
  <!-- |___________|                                 -->
  <!-- |     |     |                                 -->
  <!-- |  B  |  C  |                                 -->
  <!-- |_____|_____|                                 -->
  <!--                                               -->
  <page-layout>
    <column>
      <row>
        <portlet
         ref="com.ibm.isc.samples.layout.A_Portlet"/>
      </row>
      <row>
        <column>
          <portlet
          ref="com.ibm.isc.samples.layout.B_Portlet"/>
        </column>
        <column>
          <portlet
          ref="com.ibm.isc.samples.layout.C_Portlet"/>
        </column>
      </row>
    </column>
  </page-layout>
</page>
```

```
<page uid="com.ibm.isc.samples.layout.2colsrow_pg">
  <title locale="en">Two Columns and Row</title>
  <!--                                                  -->
  <!-- This page layout has two rows, with              -->
  >!--           two columns in the first row.          -->
  <!--   _______                                        -->
  <!-- |    |    |                                      -->
  <!-- | A  | B  |                                      -->
  <!-- |____|____|                                      -->
  <!-- |         |                                      -->
  <!-- |    C    |                                      -->
  <!-- |_________|                                      -->
  <!--                                                  -->
  <page-layout>
    <column>
      <row>
        <column>
          <portlet
          ref="com.ibm.isc.samples.layout.A_Portlet"/>
        </column>
        <column>
          <portlet
          ref="com.ibm.isc.samples.layout.B_Portlet"/>
        </column>
      </row>
      <row>
        <portlet
        ref="com.ibm.isc.samples.layout.C_Portlet"/>
      </row>
    </column>
  </page-layout>
</page>
```

```
<page uid="com.ibm.isc.samples.layout.col2rows_pg">
  <title locale="en">Column and Two Rows</title>
  <!--                                             -->
  <!-- This page layout has two columns, with      -->
  <!--                  two rows in column two.    -->
  <!--   _______                                   -->
  <!-- |   | B |                                   -->
  <!-- | A |___|                                   -->
  <!-- |   | C |                                   -->
  <!-- |___|___|                                   -->
  <!--                                             -->
  <page-layout>
    <row>
      <column>
        <portlet
        ref="com.ibm.isc.samples.layout.A_Portlet"/>
      </column>
      <column>
        <row>
          <portlet
          ref="com.ibm.isc.samples.layout.B_Portlet"/>
        </row>
        <row>
          <portlet
          ref="com.ibm.isc.samples.layout.C_Portlet"/>
        </row>
      </column>
    </row>
  </page-layout>
</page>
```

```
<page uid="com.ibm.isc.samples.layout.2rowscol_pg">
  <title locale="en">Two Rows and Column</title>
  <!--                                               -->
  <!-- This page layout has two columns, with        -->
  <!--                  two rows in column one.      -->
  <!--    _______                                    -->
  <!-- | A |   |                                     -->
  <!-- |___| C |                                     -->
  <!-- | B |   |                                     -->
  <!-- |___|___|                                     -->
  <!--                                               -->
  <page-layout>
    <row>
      <column>
        <row>
          <portlet
          ref="com.ibm.isc.samples.layout.A_Portlet"/>
        </row>
        <row>
          <portlet
          ref="com.ibm.isc.samples.layout.B_Portlet"/>
        </row>
      </column>
      <column>
        <portlet
        ref="com.ibm.isc.samples.layout.C_Portlet"/>
      </column>
    </row>
  </page-layout>
</page>
```

```
<page uid="com.ibm.isc.samples.layout.2colsw2rows_pg">
  <title locale="en">Two Columns with Rows</title>
  <!--                                                  -->
  <!-- This page layout has two columns.  Each          -->
  <!-- column contains two rows.                        -->
  <!--    _______                                       -->
  <!-- | A | C |                                        -->
  <!-- |___|___|                                        -->
  <!-- | B | D |                                        -->
  <!-- |___|___|                                        -->
  <!--                                                  -->
  <page-layout>
    <row>
      <column>
        <row>
          <portlet
          ref="com.ibm.isc.samples.layout.A_Portlet"/>
        </row>
        <row>
          <portlet
          ref="com.ibm.isc.samples.layout.B_Portlet"/>
        </row>
      </column>
      <column>
        <row>
          <portlet
          ref="com.ibm.isc.samples.layout.C_Portlet"/>
        </row>
        <row>
          <portlet
          ref="com.ibm.isc.samples.layout.D_Portlet"/>
        </row>
      </column>
    </row>
  </page-layout>
</page>
```

```
          <page uid="com.ibm.isc.samples.layout.2rowsw2cols_pg">
            <title locale="en">Two Rows with Columns</title>
            <!--                                                -->
            <!-- This page layout has two rows.  Each           -->
            <!-- row contains two columns.                      -->
            <!--   _______                                      -->
            <!-- | A | B |                                      -->
            <!-- |___|___|                                      -->
            <!-- | C | D |                                      -->
            <!-- |___|___|                                      -->
            <!--                                                -->
            <page-layout>
              <column>
                <row>
                  <column>
                    <portlet
                    ref="com.ibm.isc.samples.layout.A_Portlet"/>
                  </column>
                  <column>
                    <portlet
                    ref="com.ibm.isc.samples.layout.B_Portlet"/>
                  </column>
                </row>
                <row>
                  <column>
                    <portlet
                    ref="com.ibm.isc.samples.layout.C_Portlet"/>
                  </column>
                  <column>
                    <portlet
                    ref="com.ibm.isc.samples.layout.D_Portlet"/>
                  </column>
                </row>
              </column>
            </page-layout>
          </page>
       </org-node>
     </org-node>
   </content-type>
 </content-hierarchy>

</component>
```

```
<page uid="com.ibm.isc.samples.layout.2colsw2rows_pg">
  <title locale="en">Two Columns with Rows</title>
  <!--                                                  -->
  <!-- This page layout has two columns.  Each        -->
  <!-- column contains two rows.                      -->
  <!--      _______                                   -->
  <!-- | A | C |                                      -->
  <!-- |___|___|                                      -->
  <!-- | B | D |                                      -->
  <!-- |___|___|                                      -->
  <!--                                                  -->
  <page-layout>
    <row>
      <column>
        <row>
          <portlet
          ref="com.ibm.isc.samples.layout.A_Portlet"/>
        </row>
        <row>
          <portlet
          ref="com.ibm.isc.samples.layout.B_Portlet"/>
        </row>
      </column>
      <column>
        <row>
          <portlet
          ref="com.ibm.isc.samples.layout.C_Portlet"/>
        </row>
        <row>
          <portlet
          ref="com.ibm.isc.samples.layout.Graphical_Portlet"/>
        </row>
      </column>
    </row>
  </page-layout>
</page>
```

```
<!-- Defines content for a navigation pane, defines access rights, sets filtering criteria keywords. -->
 <content-hierarchy>
  <content-type name="workItemPage" supported-markup="html">
   <org-node uid="com.ibm.superprod.security.lan.licensenode" >
     <title locale="iscKey">view</title>
     <access-control>
      <role permit="Administrator" />
     </access-control>
     <page uid="com.ibm.superprod.security.lan.LicensePage" keyword="security">
      <title locale="iscKey">license</title>
      <page-layout>
       <row>
        <portlet ref="local_LicensePortlet"/>
       </row>
      </page-layout>
     </page>
   </org-node>
   <org-node uid="com.ibm.superprod.security.lan.rootnode" keyword="lan, security" >
     <title locale="iscKey">admin_assets</title>
     <access-control>
      <role permit="User" />
      <role permit="Administrator" />
     </access-control>
```

```
<org-node uid="com.ibm.superprod.security.lan.inventorynode"  keyword="lan">
  <title locale="isckey">inventory</title>
  <page uid="com.ibm.superprod.security.lan.RegisterPage">
    <title locale="isckey">userid</title>
    <page-layout>
      <row>
        <portlet ref="com.ibm.lanx.portlets.Registration_Portlet"/>
      </row>
    </page-layout>
  </page>
  <page uid="com.ibm.superprod.security.lan.IPAddressPage"
    PgHelpPluginID="com.ibm.superprod.security.lan.help.doc"
    PgHelpFilePath="tasks/ipaddr_page.htm">
    <title locale="isckey">address</title>
    <page-layout>
      <row>
        <portlet ref="com.ibm.lanx.portlets.IPAddress_Portlet"/>
      </row>
    </page-layout>
  </page>
  <page uid="com.ibm.superprod.security.lan.LocationPage">
    <title locale="isckey">location</title>
    <page-layout>
      <row>
        <portlet ref="com.ibm.lanx.portlets.Location_Portlet"/>
      </row>
    </page-layout>
  </page>
```

```
<page uid="com.ibm.superprod.security.lan.UserListPage">
  <title locale="iscKey">users</title>
  <access-control>
    <role permit="Administrator" exclude="User" />
  </access-control>
  <page-layout>
    <row>
      <portlet ref="com.ibm.lanx.portlets.User_List_Portlet"/>
    </row>
  </page-layout>
</page>
</org-node>
</org-node>
</content-type>
</content-hierarchy>
```

2662

2665

2668

2700

USING CONTENT AGGREGATION TO BUILD ADMINISTRATION CONSOLES

CROSS REFERENCE TO RELATED APPLICATIONS

The present invention is related to the inventions disclosed in the following commonly-assigned U.S. patent applications: Ser. No. 10/795,007, entitled "Federating Legacy/Remote Content into a Central Network Console", which was filed on Mar. 5, 2004 (now U.S. Pat. No. 7,444,633); and Ser. No. 10/754,375, entitled "Dynamic Composition of Help Information for an Aggregation of Applications", which was filed on Jan. 9, 2004 (now U.S. Pat. No. 7,890,864). The disclosures in these commonly-assigned patents are hereby incorporated herein by reference as if set forth fully.

BACKGROUND OF THE INVENTION

1. Field of the Invention

The present invention relates to computing systems, and deals more particularly with techniques for leveraging content aggregation techniques and frameworks (such as Web portals) for creating and deploying administration consoles, where those consoles may be used (for example) with operations such as resource configuration and systems management.

2. Description of the Related Art

Computer software and hardware systems are often configured, monitored, and managed by one or more administrators using graphical user interfaces called "consoles". Often, each system component within an information technology ("IT") environment has its own independently-developed console for carrying out these operations. Even a relatively small business can require a number of different computer-based products (including hardware components and/or software components) for its business solution, and a large business or other enterprise may have a very large number of such products in its IT environment. As a result, an administrator working in the IT environment may be faced with a large number of different consoles, each of which may potentially have different behavior and/or presentation conventions.

Requiring an administrator to learn how to use multiple different consoles is time-consuming and therefore costly. Requiring an administrator to work with multiple different consoles is also inefficient and creates an error-prone situation. For example, the administrator may require extra time for locating a desired function when changing among consoles having different presentation characteristics, and may make errors when he or she forgets the various behavioral differences among the consoles (such as the severity of a problem being depicted through a different set of colors on different consoles). Creating and maintaining a variety of product-specific consoles is also inefficient and costly for product development organizations.

Prior art consoles also suffer from other problems. In many cases, a console is installed on, and operates on, the same physical device as the product that it manages. (For example, a console that provides operations for managing a server application may be installed on the device running the server software.) In other cases, a console is installed on the workstation of every administrator needing access to the console. Both of these approaches are referred to herein as an "installed console" scenario. An enterprise can easily grow to have tens of thousands of these installed, and—even though the various instances of the installed console do not have different behavior and presentation conventions—the administrator must perform a series of mostly-redundant operations to upgrade each of the consoles when the corresponding product has to be upgraded and maintained.

Another problem with many existing consoles is that the presentation of administration functions is typically aligned with the structure of the products comprising the business solution, rather than being designed to provide a solution to an administrator's task at hand. When an administration console has been designed to administer a collection of products but a particular IT environment does not install all of those products, it may be a difficult or time-consuming task to modify the console to address only the appropriate subset of products; in other cases, such modifications may not be possible, leaving the administrator to use a console that reflects uninstalled products.

Prior art consoles also require significant duplicated effort for performing a particular action multiple times, which is burdensome and inefficient for administrators. For example, if an administrator needs to start or stop several servers, prior art consoles require the start or stop action to be carried out separately for each such server. When products from different vendors or products using different operating systems are present in an IT environment, then it often happens that the command syntax for carrying out an operation varies among the products. This can be confusing, error-prone, and inefficient for administrators.

Accordingly, what is needed are improvements to administration consoles.

SUMMARY OF THE INVENTION

An object of the present invention is to provide improvements for administration consoles.

Another object of the present invention is to provide techniques for leveraging content aggregation frameworks in administration consoles.

A further object of the present invention is to provide a Web-accessible console that consolidates the administration interfaces for an arbitrary collection of hardware and/or software resources.

Still another object of the present invention is to provide a console that is flexibly updateable by its user(s).

Yet another object of the present invention is to provide a console that enables an operation to be applied to multiple targets (where those targets may, in some cases, use differing functional interfaces).

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be deployed as methods, systems, and/or computer program products embodied on one or more computer-readable media. In one aspect, the present invention provides content aggregation techniques for a console, comprising: defining one or more views that are renderable on the console, wherein a definition of each view specifies one or more content-creating software entities that can be invoked to create content to be rendered in the view; rendering one of the defined views, wherein a selectable representation (such as a hyperlink containing a name or other identifying information, an icon, etc.) is also rendered for at least one of the invocable software entities specified in the definition for the rendered view; invoking a particular one of the invocable software entities, responsive to selection of the selectable representation thereof, and rendering, on the console, content created by the invoked software entity.

The invoking may further comprise invoking a plurality of the invocable software entities, and the rendering may further comprise rendering content created by more than one of the invoked software entities (e.g., responsive to invoking a selectable representation of a different view). Each of the definitions is preferably specified using a markup language document, such as a markup language document encoded in Extensible Markup Language notation.

The view may be designed as a page. Each view definition may further comprise information to be used when creating the selectable representations of the invocable software entities and/or views. The selectable representation may be rendered in a navigation pane of the console, and this navigation pane may be dynamically built.

Optionally, at least one of the definitions may further comprise an identification of one or more authorized users of one or more of the invocable software entities specified in that definition. In this case, the selectable representation may be suppressed for each invocable software entity for which a current user of the console is not one of the identified authorized users. Authorized users may additionally, or alternatively, be specified for one or more of the defined views, and the selectable representation may be suppressed if the current user is not an authorized user for the view. In other approaches, the selectable representation may be suppressed for each invocable software entity for which an implementation is not available and/or a selectable representation of each view for which no invocable software entity implementation is available may be suppressed.

Optionally, at least one of the definitions may further comprise filtering criteria associated with one or more of the invocable software entities. In this case, the selectable representation may be suppressed for each invocable software entity for which the filtering criteria do not match currently-active filtering preferences. The currently-active filtering preferences may be the preferences of a current user of the console.

In one approach, an aggregation framework is used for the console. This aggregation framework may be a portal, and the invocable software entities may be portlets.

A new renderable view may be defined that specifies one or more of the content-creating software entities specified in one or more previously-defined views, where the new view enables content created by those content-creating software entities to be rendered in an alternative arrangement. The manner in which content in a previously-defined view will be rendered may be changed by altering the specification of the content-creating software entities in the previously-defined view. Additional content may be programmatically added to a previously-defined view, responsive to installation of a resource to be managed from the console, without requiring human interaction to cause the addition. Similarly, previously-defined content may be programmatically removed from a previously-defined view, responsive to uninstalling a resource to be managed from the console, without requiring human interaction to cause the removal.

In another aspect, the present invention provides techniques for providing a console for a user, further comprising: specifying a definition for each of a plurality of pages, wherein each definition identifies at least one invocable software entity for each page; rendering one of the pages on the console for the user, using page layout information specified in the definition for the rendered page; selecting, by the user from the rendered page, a plurality of the invocable software entities, using a selectable representation thereof that is rendered on the console; invoking the selected software entities; aggregating content resulting from the invoking step into an aggregated view, according to the page layout information specified in the definition for the rendered page; and rendering the aggregated view on the console. A plurality of invocable software entities may be selected, for example, using a selectable representation that applies to multiple resources, and a task may be invoked against the multiple resources. At least two of the resources against which the task is invoked may be different from one another, in some cases, and this difference is transparent to the user during the invocation.

The present invention will now be described with reference to the following drawings, in which like reference numbers denote the same element throughout.

BRIEF DESCRIPTION OF THE DRAWINGS

FIG. 5 (comprising FIGS. 5A-5I) illustrates how a markup language document may be used for specifying an easily-modifiable layout of aggregated content that is provided according to preferred embodiments, and FIG. 8 illustrates one such modification.

FIG. 26 (comprising FIGS. 26A-26C) provides a sample markup language document in which navigation elements, access rights information, and filtering criteria keywords are specified.

DESCRIPTION OF PREFERRED EMBODIMENTS

The present invention provides techniques for using content aggregation to build administration consoles. The resulting consoles may be used advantageously in many ways, several of which will be described herein by way of illustration. For example, administration consoles may be used for system set-up operations, resource configuration, run-time monitoring, and/or systems management.

Preferred embodiments are described herein with reference to using Web portals as the content aggregation framework, and using software entities known as portlets for creating content that is to be rendered in the console. It should be noted, however, that references herein to using portals or portlets are by way of illustration and not of limitation. Alternatively, a different framework and/or different types of content-creating software entities may be used, without deviating from the scope of the present invention. As one example, a "struts and tiles" approach may be used to provide the framework and the content. (Struts is a framework for building Java® Web applications, and was created as part of the Apache Jakarta Project that is sponsored by the Apache Software Foundation. Refer to the Apache Web site or publications for more information. "Java" is a registered trademark of Sun Microsystems, Inc. in the United States, other countries, or both.)

The term "console module" is used herein to refer to a unit of function deployed within a console. According to preferred embodiments, each console module comprises all elements required to add the new function, including portlets, page definitions, navigation elements, and help information that corresponds to the page and its elements. One or more console modules may be used for administering a particular resource or combination of resources. Preferred embodiments are therefore described herein with reference to portlets as the units that are aggregated into a view, and console modules as the units that are separately plugged into the console. Console modules may contain zero or more portlets, page layout definitions, which are preferably created using a markup language such as the Extensible Markup Language, or "XML" (with filters, access control information, and so forth, as discussed below) and associated help information, and other resources like widget libraries or images. Console modules can be added to or taken away from the console, and portlets can be added to or taken away from an aggregated view.

A variety of operations may be performed on the consoles of the present invention. Terms such as "management operations", "systems management operations", or "administrative functions" are used herein, for ease of reference, although these terms are not meant to limit the scope of the present invention.

Figure 1:
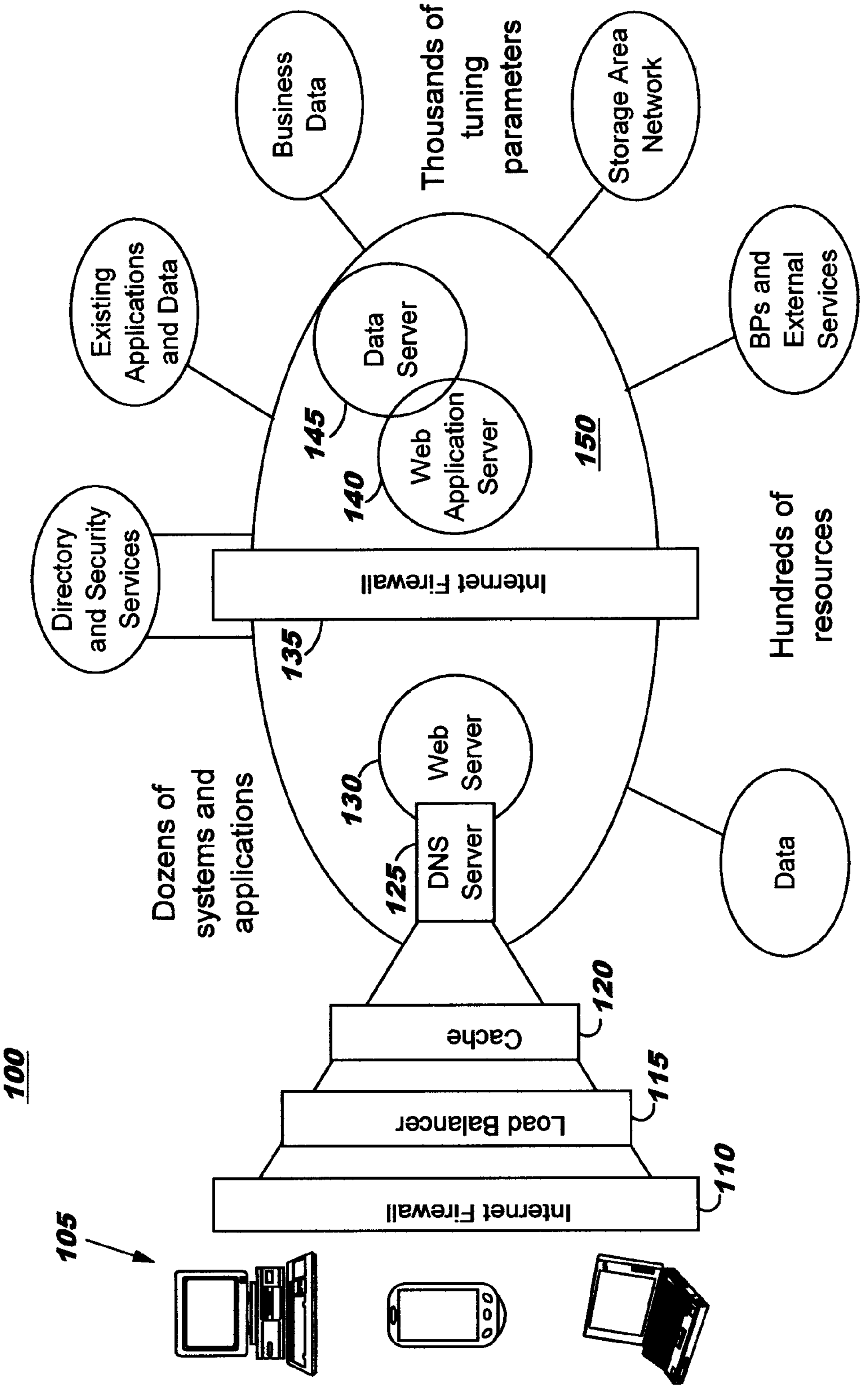
FIG. 1 illustrates a complex heterogeneous IT environment of the type that may need to be administered.

FIG. 1 illustrates, by way of example, a complex heterogeneous IT environment 100 of the type that may be deployed within a complex enterprise. As shown therein, a number of different types of end user devices 105 (referred to generally herein as workstations) may be used as access points in environment 100, and the communication path into network 150 in this environment typically encounters an Internet firewall 110, a load balancer 115, and a caching system 120. A Domain Name System ("DNS") server 125 may be encountered to resolve the address of a Web server 130, which is separated from a Web application server 140 and data server 145 using a second Internet firewall 135. As noted in FIG. 1, this IT environment 100 may include dozens of systems and applications and hundreds of resources, and thousands of tuning parameters may be defined; a complex IT environment might even contain millions of system and application resources. A console according to embodiments of the present invention may be used advantageously when administering a complex environment such as that depicted: both the number and the nature of the managed resources are extensible in an indefinitely large number of combinations. (Embodiments of the present invention may also be used advantageously in less complex environments, as will be obvious.)

Embodiments of the present invention enable reducing the time required for administrators to learn and to use the console, and improve the accuracy of management operations, as administrators benefit from a consistent console "look and feel". By leveraging industry standard technologies, as disclosed herein, the cost of developing and maintaining consoles for IT resources is reduced, and the time-to-market for new IT products can therefore be shortened since standard development tools can be used create and maintain console modules and personnel with appropriate skills are easier to find. Furthermore, use of standards-based interfaces enables developers from numerous companies to contribute content that can be used in the console, and this content can be developed using standard Web application development tools.

When using preferred embodiments of the present invention, console content is determined by the products that are installed with the console (either locally or in the network). The present invention also enables consoles to be arranged such that the presentation of administrative functions is aligned with the solutions and processes set up by the IT organization (or other enterprise, equivalently) where the console will be deployed. This is in contrast to prior art approaches where the console matches the structure of the products that comprise the solution. These prior art approaches are typically designed using a "one size fits all" approach, and may be difficult to modify when an enterprise does not deploy the full set of products or intend to realize the full set of function addressed on the prior art console. Using the present invention, however, a particular enterprise can change its installed product set, and therefore the mix of products being managed, and embodiments of the present invention allow the console in use for managing these products to adapt transparently to the change without requiring any user action beyond installing or uninstalling products: when a particular product is installed, its console modules are programmatically plugged in, or added, to the console, and when a product is uninstalled, its console modules are programmatically removed from the console. The administrator is not required to perform configuration work to cause these console modules to be added or removed.

Default content arrangements may be provided with embodiments of the present invention, where these default arrangements may serve as a starting point for customization, e.g., by system integrators. System integrators may specify customizations that arrange portlet content to match business processes or, equivalently, to match other design objectives such as an organization's administrative structure. Suppose, for example, that a particular administrator within an organization is responsible for ensuring that everything runs smoothly during the organization's bi-weekly payroll processing. A system integrator may therefore arrange content within a portal page to include a monitoring portlet for every system resource that is used in the payroll process, enabling the administrator to determine with a quick glance whether everything is running smoothly. Thus, the page layout is designed in terms of the smooth running of the payroll process, not in terms of the set of products that happen to be installed in this organization. (Note that this customization of page layout occurs at design time, in preferred embodiments, when the XML syntax for a page definition is created. Refer to the discussion of FIG. 21, below, for more information about how a page definition that identifies a plurality of portlets may be processed when a console module is being deployed.)

A system integrator might arrange content views of interest to one IT environment's administrators in one way, while the views created for another IT environment's administrators might group the content in other ways. And, content views defined for a particular IT environment can be easily changed, if desired, using techniques of the present invention.

Embodiments of the present invention also preferably enable system administrators to individually customize their consoles. An administrator might choose to display a highway-traffic-reporting portlet on the page that provides views of other tasks this administrator performs just before leaving work for the day, for example. Many other types of administrator-specific customizations might also be performed. Usability is therefore greatly improved, as contrasted to prior art fixed-format consoles. Preferably, customizations performed by individual administrators use page-modifying portlets provided through standard portal user interfaces of the prior art. (Note that techniques disclosed herein are not limited to use by end users who have particular job titles such as system administrators. Thus, references herein to various job titles are by way of example.)

Using techniques disclosed herein, reductions may be realized in the time required for an administrator to perform an action on several different instances of the same or similar resource. As one example, multiple servers may be started or stopped with a single action (or action sequence). This is true even though some of the servers might have a different mechanism for starting or stopping, as compared to others of those servers: rather than requiring the administrator to learn each different server-specific approach, embodiments of the present invention provide a consistent approach for the administrator and transparently resolve the individual differences. For example, an administrator may select a set of servers and execute a particular operation on all of them, without needing to know that they may be different types of servers with different administrative interfaces. This means that different products can share the same portlets for similar purposes or even use the same portlet to manage their combined set of similar resources. Similarly, the administrator's interactions with resources other than servers can be uniform when using embodiments of the present invention. As another example, resources that log information during execution may use different types of storage repositories (such as a directory database, relational database, conventional flat files, and so forth), and embodiments of the present invention enable the administrator to have a consistent point of access into the stored information without having to adapt his or her interactions to the nuances of each type of repository.

As a result of these and other advantages provided by embodiments of the present invention, the overall cost of ownership of IT resources (including systems and networks) may be reduced.

Preferred embodiments of the present invention build a console as a network-accessible application (referred to equivalently hereinafter as a "Web-based" application) that leverages a content aggregation technology (such as portal aggregation). This Web-based approach provides significant advantages over prior art consoles that are installed directly on an administrator's workstation or on the product to be managed. Now, rather than requiring deployment of numerous instances of the console in a number of different locations, techniques of the present invention allow accessing a centralized, remotely-operating (i.e., network-accessible) console application. Furthermore, this access may be made using general-purpose software, such as a browser, that is already resident on the administrator's workstation. This greatly reduces the cost of deployment and maintenance for an enterprise.

Figure 2:
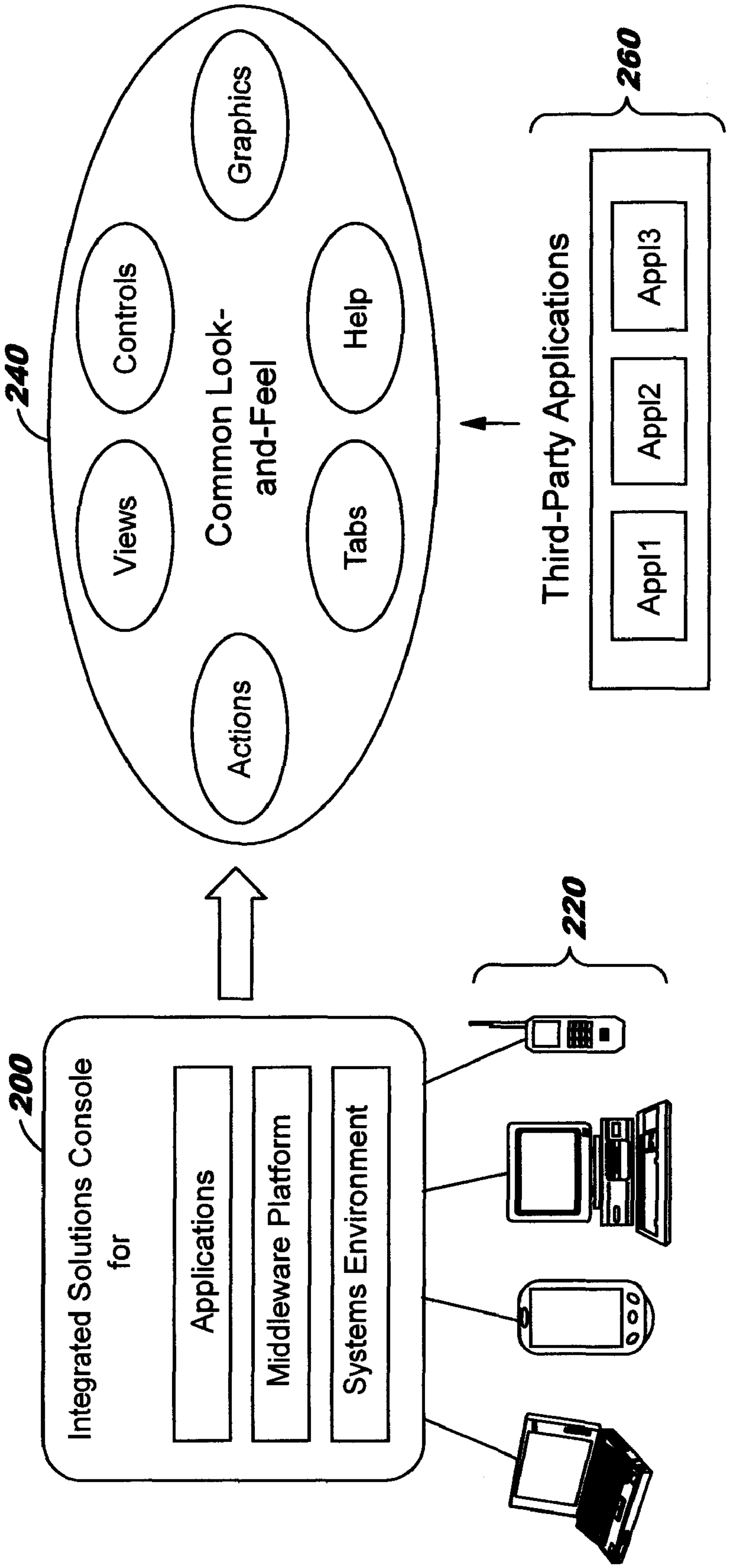
FIG. 2 depicts, in an abstract manner, the approach used in preferred embodiments to provide an administration console that offers users a single point of access.

FIG. 2 illustrates abstractly how an integrated console 200, as disclosed herein, provides a common look and feel when administering resources. A number of graphical elements, such as views, controls, and so forth (shown generally at 240 in FIG. 2), can be shared in this process. Common services such as navigation panes, status areas, and user assistance (which may be provided using common, shareable portlets) can be shared among multiple integrated console modules when using embodiments of the present invention. The related invention titled "Dynamic Composition of Help Information for an Aggregation of Applications" discloses techniques for aligning the presentation of help information (or other information) with the presentation of content for which help may be requested. Techniques disclosed in this related invention may optionally be used in combination with techniques disclosed herein.

FIG. 2 also illustrates a variety of end user devices 220 accessing the console 200, and applications 260 (which may be supplied from a variety of sources, including third-party content providers) may be represented in the console view using (for example) view elements as depicted at 240 to obtain a common look and feel.

Standard view/model interfaces, such as those provided by the Java 2 Platform, Enterprise Edition (which is commonly referred to as "J2EE"®) are used in preferred embodiments to connect the view elements rendered by portlets to the back-end resources that are being monitored or controlled. Those interfaces may include Java Management Extensions, or "JMX"; Web services; and so forth. ("J2EE" is a registered trademark of Sun Microsystems, Inc. in the United States, other countries, or both.)

The content aggregation framework provides a central infrastructure, through which the console is network accessible, and supports a set of pluggable console modules that provide specific administrative functions. If an enterprise changes its set of installed products, the install packages of new products may add new content to the console framework by plugging in one or more console modules, while uninstall programs of removed products may remove the console modules that were previously plugged into the console for those removed products. This happens without requiring user interaction, in preferred embodiments. Each administrator who accesses the centralized console then sees the revised view, without having to modify that administrator's workstation.

Using a content framework with plug-ins for selected administrative functions, different IT environments get different console modules plugged into the console framework by installing different sets of products, thereby flexibly tailoring a particular console to the set of resources to be administered and customized by administrators that will be using the centralized console. System integrators (or others) can structure pages to match business processes, and portlets contained in one or more other console modules can be used to create the layout of a particular page. Each administrator is able to organize the view of the selected plug-ins according to his or her preferences using standard portal customization. Accordingly, the content provided by separate products can be combined in new ways, matching the way a particular administrator thinks about the business solution which is being managed. (The typical approach in prior art consoles, by way of contrast, requires the console presentation to match the organization of the products in that business solution, as has been discussed earlier.)

Figure 3:
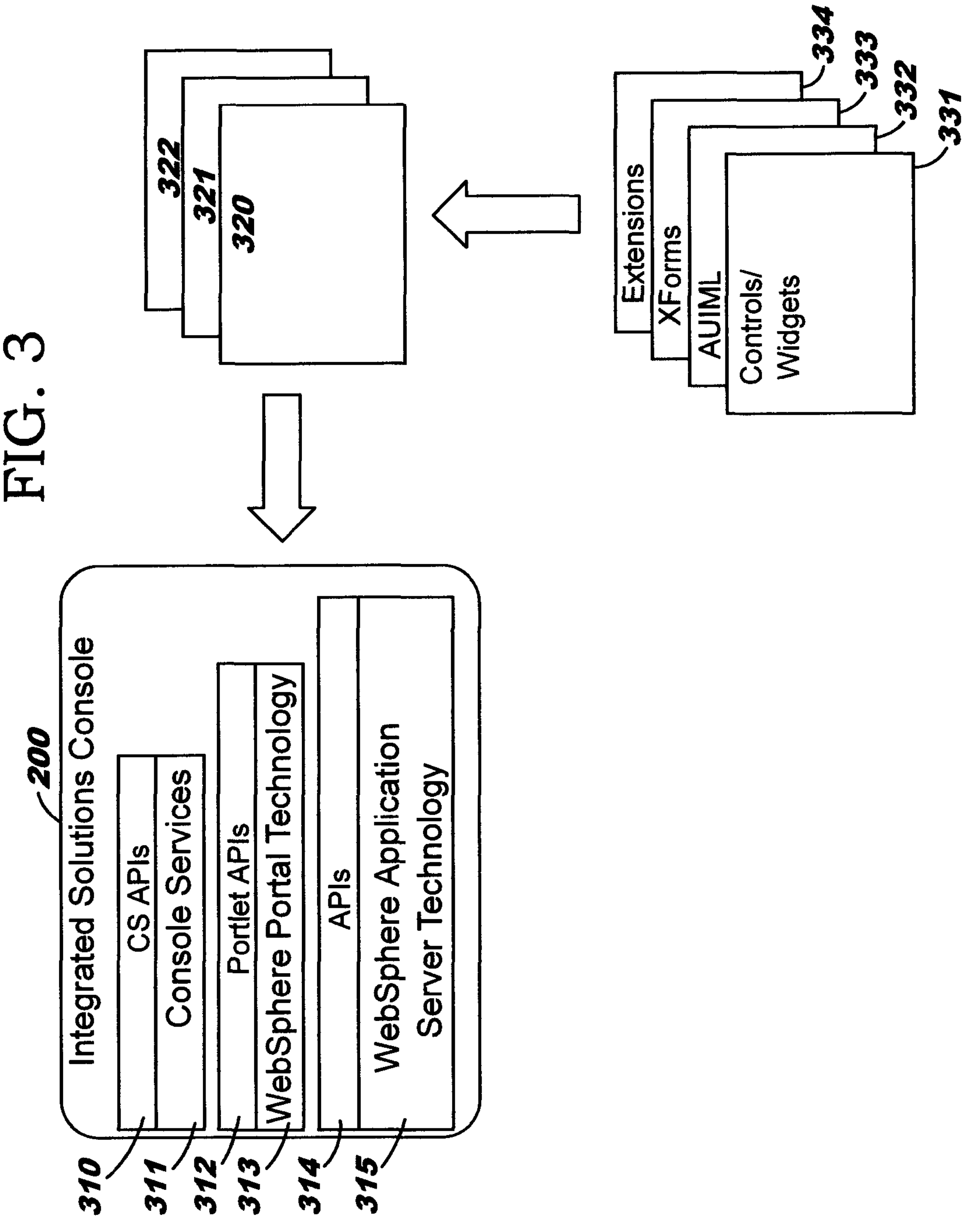
FIG. 3 illustrates an architecture comprising a console framework and a set of console modules that plug into the framework to provide a console with specific administrative capabilities, according to preferred embodiments.

FIG. 3 illustrates an architecture comprising a console framework and a set of console modules that plug into the framework to provide a console 200 with specific administrative capabilities, according to preferred embodiments. As shown therein, a layered approach may be used, and in this example, commercially-available WebSphere® Portal Server ("WPS") technology 313 and WebSphere Application Server ("WAS") technology 315 are leveraged for the console. ("WebSphere" is a registered trademark of International Business Machines Corporation, hereinafter "IBM", in the United States, other countries, or both.) In addition, a set of console services ("CS") are provided, in preferred embodiments, by a console services layer 311. The portlets in a console module that plugs in to this framework to provide a console can use services from all three layers 311, 313, 315 by invoking application programming interfaces ("APIs") 310, 312, 314 of the respective layers. For example, a portlet can use CS layer 311 for certain console-specific functions; WPS layer 313 for a portlet container and portlet services; and WAS layer 315 for authentication and to interact with various J2EE services for communicating with local and/or remote back-end resources being managed. CS layer 311 can use services 312, 314 from both the WPS layer 313 and WAS layer 315. WPS layer 313 can use services 314 from WAS layer 315. (Preferred embodiments may omit functions such as search capabilities and content management capabilities from the portal technology layer 313, thereby requiring a smaller footprint for the console.)

A "deploy" command (or analogous command) is preferably used to add console modules to the portal framework of console 200, and FIG. 3 illustrates three representative console modules 320, 321, 322 that may be added in this manner to provide content. These console modules may enable a variety of functions to manage resources. For example, one console module might contain a portlet 320 that renders content after querying a database application; the same or a different console module might contain a portlet 321 to render content pertaining to a Web server supplied by a first vendor; and a different console module might contain a portlet 322 to render content pertaining to a Web server supplied by a second vendor. Portlets 320-322 may be implemented in various ways, where each portlet might be implemented using a Web-based view technology selected from an array that includes (but is not limited to) JavaServer Pages® ("JSPs"®), intent-based marked languages, and so forth. ("JavaServer Pages" and "JSP" are registered trademarks of Sun Microsystems, Inc. in the United States, other countries, or both.) These view technologies are illustrated in FIG. 3 as four representative components 331-334 that may be used with embodiments of the present invention for creating the view in a console, as will now be described.

A set of generic controls or widgets, a Java Server Faces ("JSF") widget library, and generic scalable graphic widgets (shown generally at 331 in FIG. 3) may be used with embodiments of the present invention, where these controls/widgets may provide functionality such as building tables, tree structures, and charts or graphs for data rendering within a portlet, and so forth.

An abstract UI markup language ("AUIML") component 332 may be used, with which markup document syntax can be used to specify (inter alia) formatting information that is to be used when rendering content on the console. (AUIML is a language defined by IBM for intent-based user interface specifications. Commonly-assigned U.S. Pat. No. 6,781,609, Ser. No. 09/567,487, filed May 9, 2000, which is entitled "Technique for Flexible Inclusion of Information Items and Various Media Types in a User Interface", provides a description of the AUIML notation. Reference may be made to this commonly-assigned patent, which is incorporated herein by reference, for more information.)

An "XForms" component 333 may be used with embodiments of the present invention. XForms is a standard from the World Wide Web Consortium ("W3C"), and is intended to provide improvements over the Hypertext Markup Language ("HTML") for rendering information and performing tasks using Web-based documents. (Refer to the W3C Web page or publications for more information on XForms.) Various component extensions 334 may also be used with embodiments of the present invention. For example, interactions between console modules (via hyperlinks, selectable graphical buttons, and so forth) may be facilitated in this manner.

Since administration of multiple resources is integrated into a single infrastructure, according to preferred embodiments, the present invention enables a single view for controlling an action (such as turning a set of servers on or off, rebooting resources, and so forth) to be shared across different products and systems, even if the systems do not have the same commands for performing the function. In addition, preferred embodiments allow a number of resources to be selected, so that the same action can be replicated to these multiple resources with one request. A table of servers might be displayed, for example, along with a graphical representation of current status for each of the servers and a means for the administrator to select (e.g., by checking a box or clicking a radio button) one or more of the servers as the target of the action. According to preferred embodiments, these resources may span various systems and may be heterogeneous. For example, software resources developed by a vendor may be viewed alongside software resources developed by other vendors and/or by the enterprise's own development organization, and actions requested by the administrator on the integrated console may be applied to selected ones of these resources (with any resource-specific interfaces being transparently handled "under the covers" of the console to perform the selected actions). Preferred embodiments leverage standard interfaces such as JMX or Web services, as discussed earlier, where these standard interfaces may be used to provide functionality underlying the console to perform operations such as connecting to a managed resource, issuing commands to a managed resource, and so forth. Accordingly, while the administrator is presented with a consistent and user-friendly task interface that may span a number of managed resources, this underlying functionality preferably bridges between the administrator's task interface and the interface of each managed resource, such that any resource-specific conversions, translations, or other adaptations are automatically performed, based on the selected task and its target resources.

Figure 4:
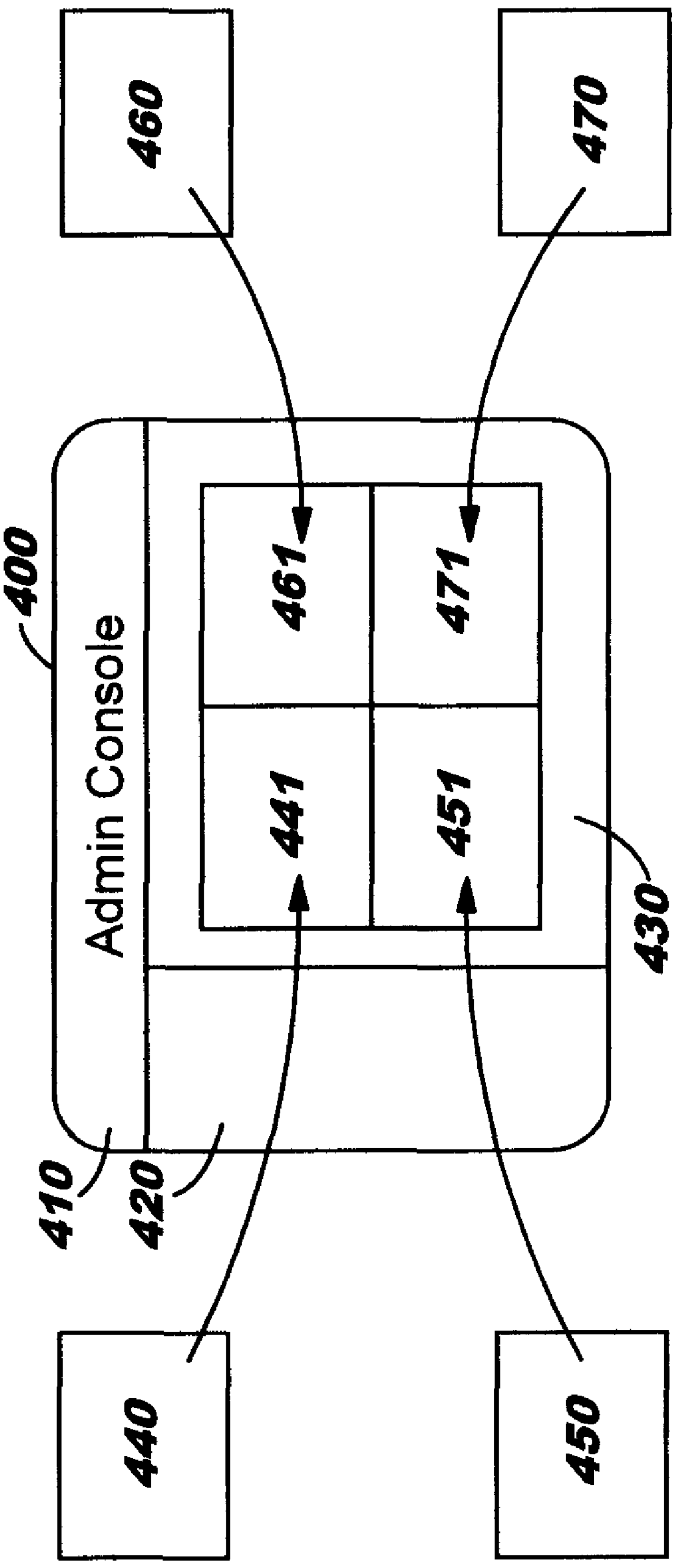
FIGS. 4, 6, and 7 illustrate several examples of administration consoles having aggregated content views, according to techniques of the present invention.

Embodiments of the present invention provide a view constructed of independently-developed user interface components (such as portlets, when using a portal model for content aggregation) that can be combined together into an administrative function. Instructions written in a markup language, such as XML, are used in preferred embodiments to specify how the console modules are to be arranged into pages. XML instructions may also be used to specify how entries are to be added to a navigation tree which is displayable on the pages. FIG. 4 abstractly illustrates a sample Web page 400, representing an administration console (see title bar 410) that has been constructed in this manner. As shown therein, the page also contains a navigation pane 420, where available tasks are preferably rendered (for example, as text that can be selected to cause execution of the corresponding task), and a work area 430, where content pertaining to a selected task is preferably rendered. In the work area 430 of sample page 400, content in four separate sub-areas or cells 441, 451, 461, 471 is arranged in two columns and two rows. FIG. 4 also shows four sample portlets 440, 450, 460, 470 that execute to create the content of these cells. The portlets might use prior art techniques to query the status of hardware devices or software applications, for example, and prior art techniques may be used to create content for rendering in individual ones of the cells to reflect that current status (where techniques of the present invention enable aggregating the cells to provide the administrator with an aggregated view).

FIGS. 5A-5I show a sample XML document 500 of the type that may be used for specifying layout information, according to preferred embodiments. This XML document 500 contains syntax specifying a wide variety of page layout styles, for purposes of illustration. In actual practice, product developers preferably provide default page layouts defining a suggested arrangement of content for their product (and this layout may be modified by the administrator and/or system integrator). As an example of how the XML syntax in document 500 defines a page layout, refer to the sample  element at reference number 510. This  element 510 has a  element 511 containing a single <row> element 512. The content of this row element 512 is a <portlet> tag 513 having an identification 514 of a particular portlet (i.e., as the value of the "ref" attribute) that presumably creates content that is appropriate for rendering in this single-row fashion. The sample  element 520 has a  element 521 containing a single <row> element 522, and in this case, the <row> element contains two <column> elements 523, 524. In each <column> element, a <portlet> tag identifies the portlet that creates the content to be rendered in that column.

Referring now to sample  element 540, syntax that may be used to specify the layout illustrated in work area 430 of FIG. 4 is shown. In this sample, the  tag 541 has a single outermost <row> tag 542, which contains two <column> tags 543, 544. Each <column> tag 543, 544 further contains two <row> tags. Within each of these four <row> tags, a portlet identifier is specified (see reference numbers 545, 546, 547, 548), thereby identifying the portlet that will create the content for a particular cell in the four-cell layout thus defined. See the comments at reference number 549, where a graphical representation of the cells represented by  element 541 is provided, each cell being identified with a letter that appears in the corresponding portlet identifier. For example, the cell identified as "A" at 549 corresponds to the portlet identifier "com.ibm.isc.samples.layout.A_Portlet", which is shown at 545. Thus, the first <column> tag 543 in the XML document 500 represents cells 441, 451 in FIG. 4, and the second <column> tag 544 represents cells 461, 471.

Figure 6:
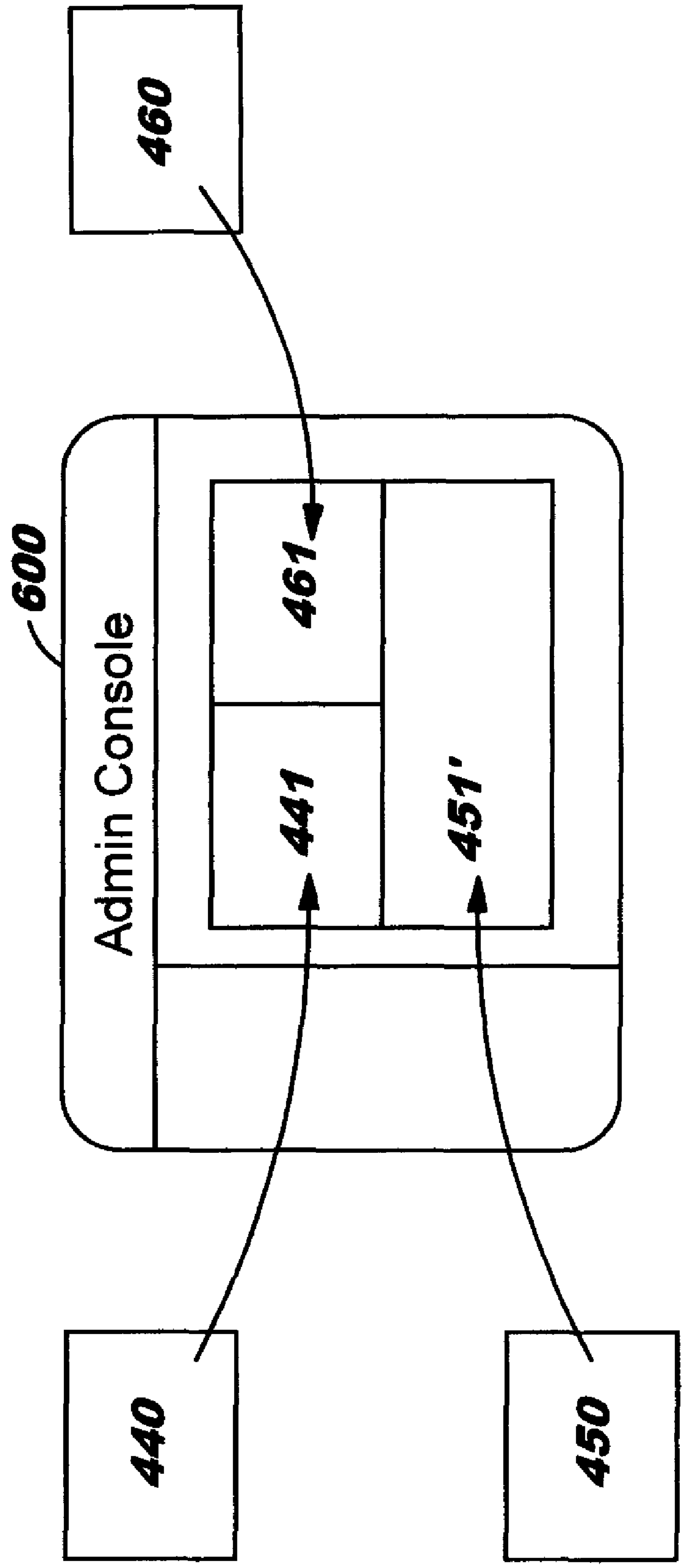

By modifying the XML document that specifies a view layout, the portlets can be arranged into different page groupings, and in particular, can be arranged into groupings that match a business solution deployed in a particular IT environment. Suppose, for example, that the administrator using console 400 decides that the product for which content is rendered at cell 471 is no longer of interest and therefore uninstalls the hardware device or the software application from the administered system. Portlet 470 is no longer relevant. With the present invention, the console is flexibly altered by the uninstall processing to omit portlet 470 from console 400 without requiring any direct reconfiguration by a user. A console 600, as shown in FIG. 6, can therefore be substituted for console 400, where this console 600 retains content cells 441, 461 and (in this example) fills the lower sub-area 451' with content created by portlet 450. (As will be obvious, in an alternative approach, a narrower area might be used for the content created by portlet 450.) Refer to reference number 530 in the XML document 500 of FIG. 5, which shows page layout syntax that may be used for specifying the layout illustrated in FIG. 6.

Figure 7:
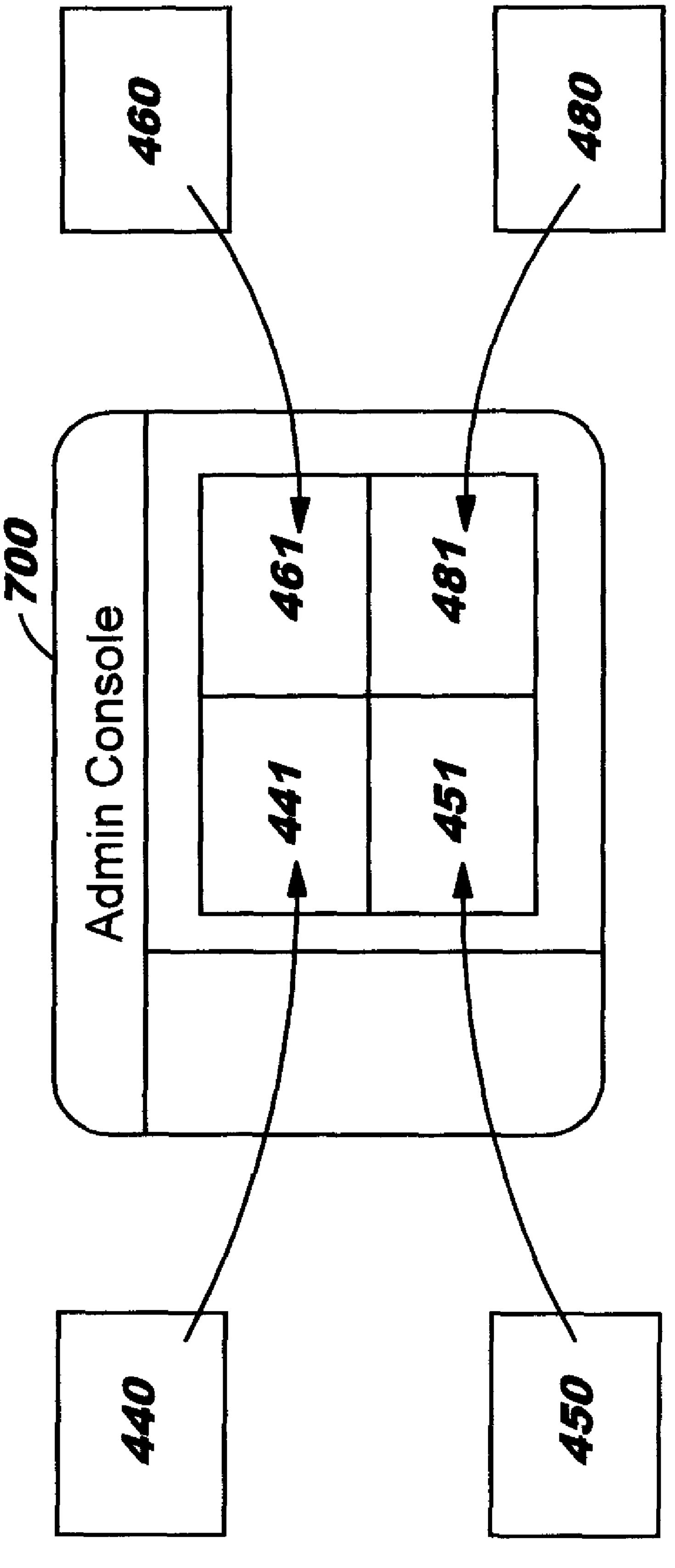

Alternatively, suppose the administrator decides that different information would be preferable as a replacement for cell 471 of console 400 in FIG. 4. For example, portlet 470 might create output in text format, whereas the administrator prefers to see output for this resource in graphical format. Assuming that another portlet 480 creates this alternative format, a different console 700 as shown in FIG. 7 can be easily created to contain that information at 481 by replacing the  element 540 in document 500 with the  element 800 shown in FIG. 8. In this sample  element 800, the new portlet 480 (which is substituted for portlet 548 of FIG. 5) is identified as "com.ibm.isc.samples.layout-.Graphical_Portlet". See reference number 810 in FIG. 8. (Note that the present invention enables portlets in one console module to be reused by other console modules, where a "reusing" module references, in its page definition XML, a portlet or portlets to be reused in that page.)

Figure 9:
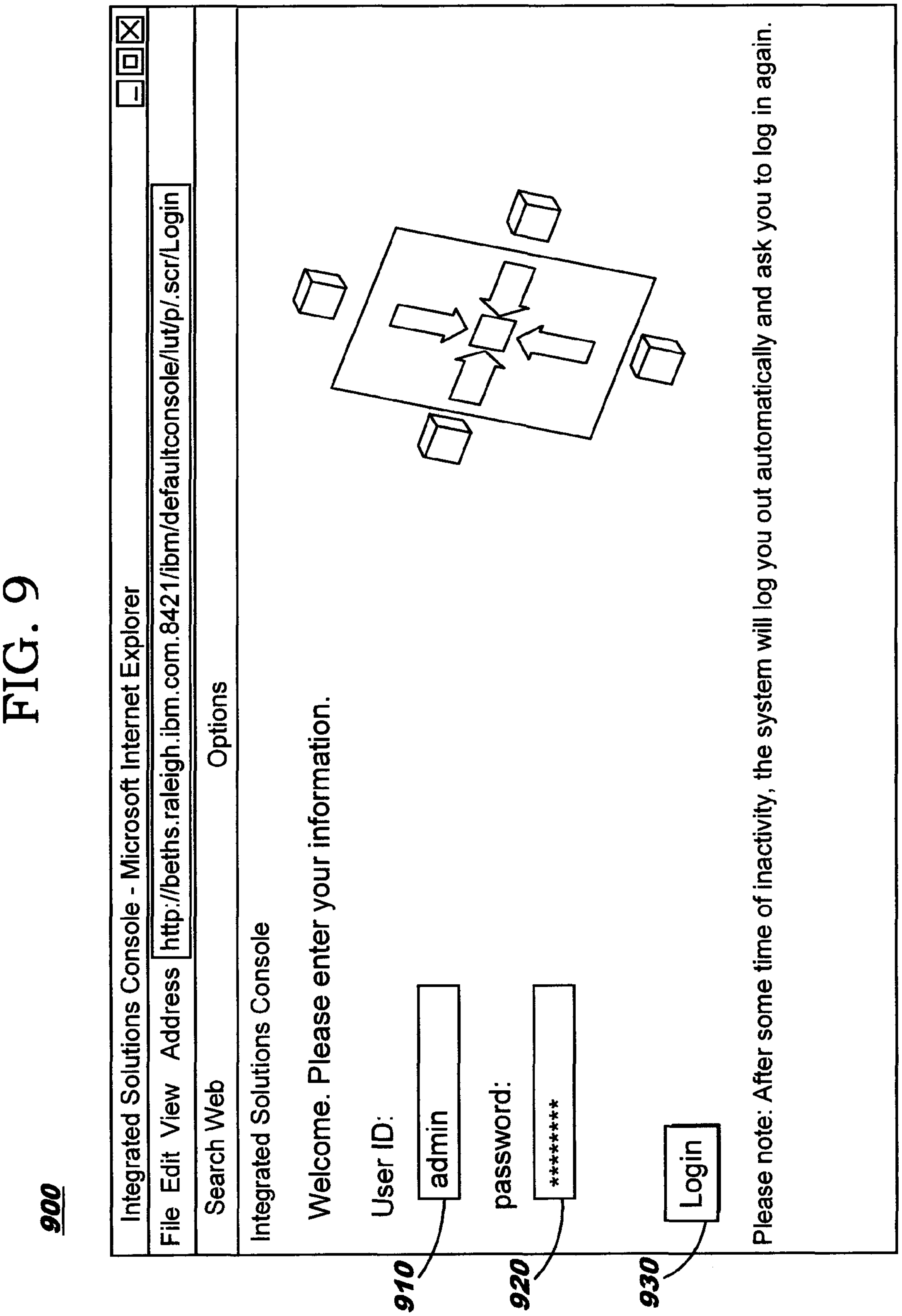
FIGS. 9-10 depicts sample views that may be provided during log-on to a console.

Turning now to FIGS. 9-13, a scenario is illustrated that shows how an administrator might log on to the administration console of preferred embodiments and then begin to perform various administration tasks. As shown in FIG. 9, a "welcome" page 900 is preferably presented, where this screen requests the administrator to enter his or her credentials, which are referred to herein (by way of illustration but not of limitation) as a user identifier ("ID") 910 and password 920. (Note that use of an aggregated console as disclosed herein may remove the burden placed on administrators by prior art, per-product consoles, where the administrator may be required to remember a distinct user ID and password combination for each of those product-specific consoles. In contrast, a single user ID and password can be used for logging an administrator on to the aggregated console of preferred embodiments.)

Upon entering the user ID 910 and password 920 information and pressing the "Log In" button 930, another page 1000 is presented, in this example scenario. See FIG. 10. In this example, page 1000 lists the tasks that are available in navigation pane 1010, and work area 1020 provides introductory information (which may vary widely among IT environments and therefore has not been illustrated in detail in this example). It may be desirable in some scenarios to provide introductory information of the type illustrated at 1020 only when the administrator first opens the console: subsequently, other page content might be provided instead of the introductory information, such as the last page viewed by this administrator or a preferred start page selected by this administrator. Embodiments of the present invention may therefore be adapted for using conditional logic to determine which page content should be presented.

The tasks in navigation pane 1010 are preferably represented in a conventional tree structure format, where folder icons are used to group tasks together and can be clicked upon to open or close the folder. FIG. 11 therefore shows an example page 1100 that may be presented when the administrator has clicked on the Troubleshooting folder icon 1030 in FIG. 10. As shown in FIG. 11, the icon 1030 is now presented as an opened folder icon 1030' in updated navigation area 1010', and text (shown generally at reference number 1110, in this example) has been added underneath the Troubleshooting entry that specifies several troubleshooting tasks that may be performed. Preferably, each task is presented in a color and/or font that indicates visually to the administrator that this text is a selectable link. Upon clicking (or otherwise activating) one of these selectable links, a corresponding task will then be launched, and the portlet or portlets corresponding to that task will then render its/their output in the work area 1020.

Figure 13:
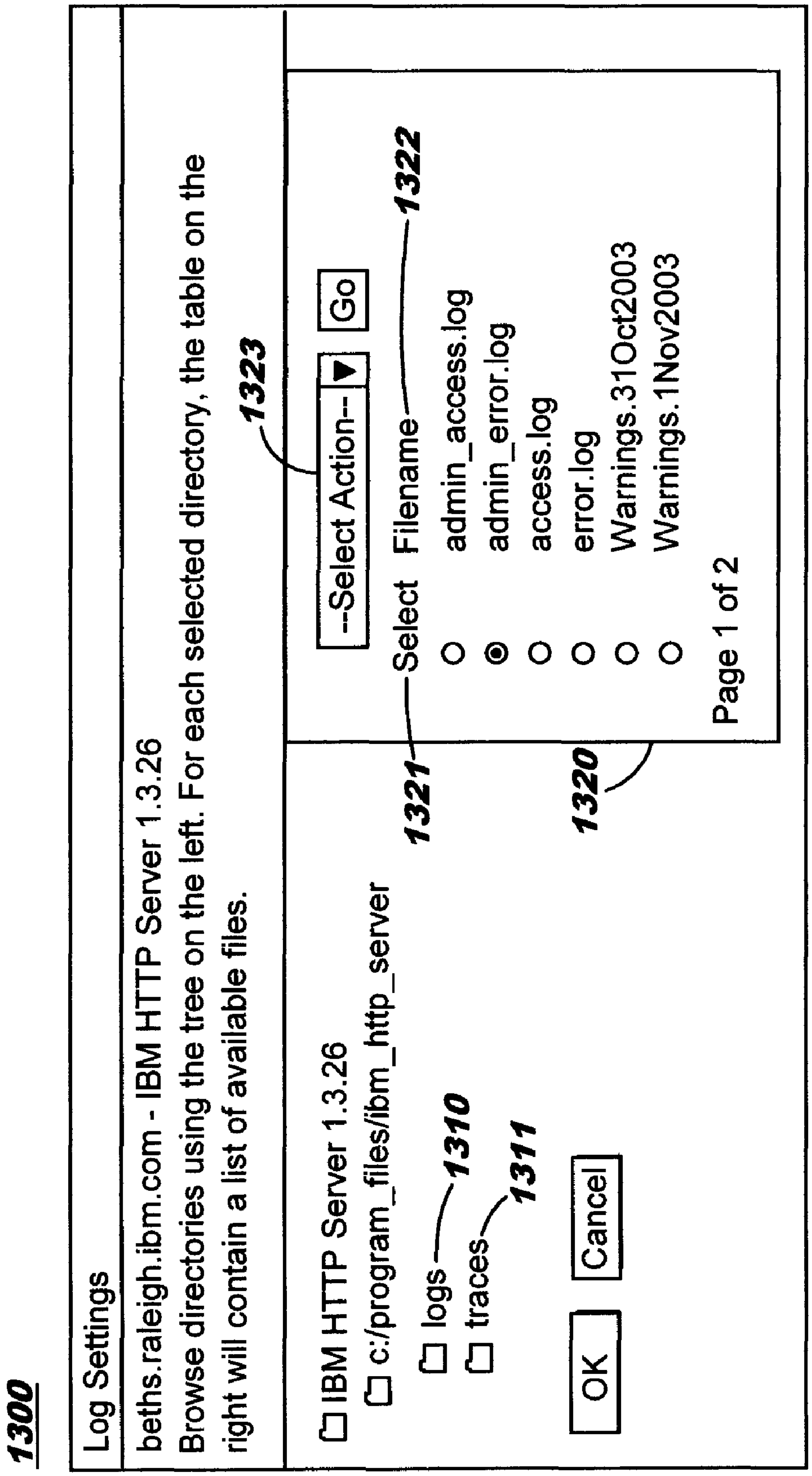

Suppose that the administrator clicks on the Logs and Traces link 1120 in FIG. 11. The contents of work area 1020 may then be replaced by content illustrated at 1200 in FIG. 12. As shown therein, a first portlet may generate a selection area 1210 that enables the administrator to select from among a list of resources for which logs or traces can be presented, and a second portlet may then generate content pertaining to the selected resource(s) and render that content in view area 1220. In this sample content view 1200, the resource selection portlet corresponding to reference number 1210 requests the administrator to select from among a plurality of defined systems (see reference number 1211) and then to select a server defined on the selected system (see reference number 1212). Upon selecting a system and server, a portlet is then executed (in this example) that presents the current log settings that have been configured for that system and server. See reference number 1220, where a representation of sample log settings is presented. The sample rendering at 1220 presents the path name 1221 where various log files for this resource are being stored, and a Browse button 1222 may be presented to enable the administrator to easily launch a task to browse the file system for other log files. FIG. 13 provides a sample view 1300 that results, in this example, from pressing the Browse button 1222. This view 1300 is created by a portlet associated with the browse task, and enables the administrator to browse folders on a managed system and select a log file as the target file for specific types of messages. In view 1300, the administrator can select to see the logs available in a specific folder by activating the link at 1310 or the link at 1311. In the example of FIG. 13, the link at 1310 has been activated, and a portlet then executes to render a representation 1320 of each available log file that has been created for the resource selected at 1211 and 1212 in FIG. 12. See, generally, the Filename column 1322, where names of the available log files are presented. The administrator may then select a log file, for example by using the radio buttons in the Select column 1321 and selecting the "OK" button.

Role-based or permission-based filtering is preferably provided by embodiments of the present invention, thereby ensuring that an administrator sees only the administrative functions that he or she is entitled to perform. For example, when user "admin" logs on to the console using the page depicted at reference number 900 in FIG. 9, embodiments of the present invention preferably consult previously-stored permission information to determine which tasks this particular administrator has permission (i.e., authority) to perform. Alternatively, a role associated with this user ID may be determined, and permissions associated with that role may be used to determine the administrator's authorized tasks. Or, group-level roles or permissions may be used, whereby a group of which this administrator is a member is determined (for example, using the provided user ID) and the tasks made available to this administrator are limited to the tasks for which members of that group are authorized. (The manner in which permissions, roles, and/or groups can be determined using a user ID is well known in the art, and therefore will not be discussed in detail herein.)

Figure 10:
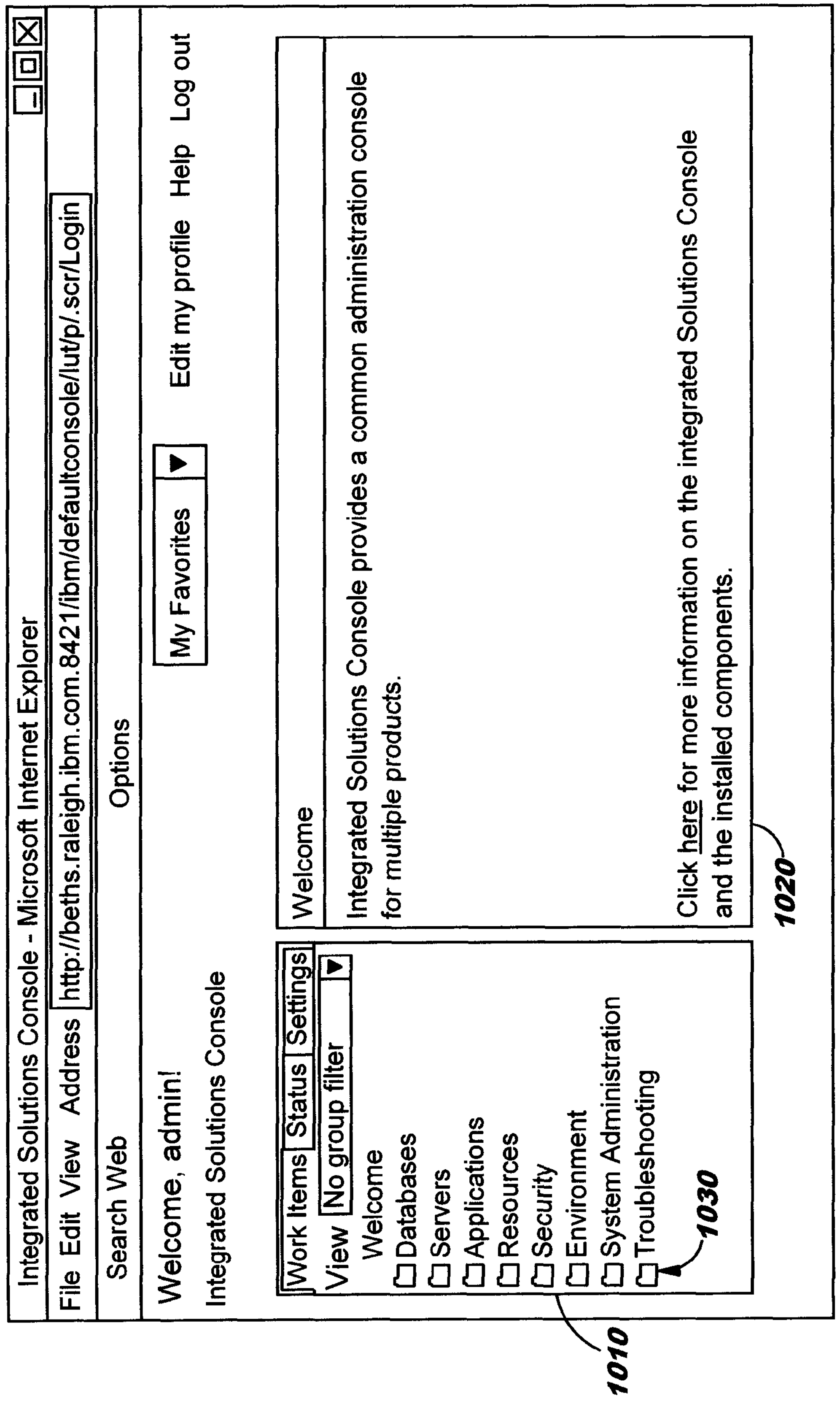
Figure 11:
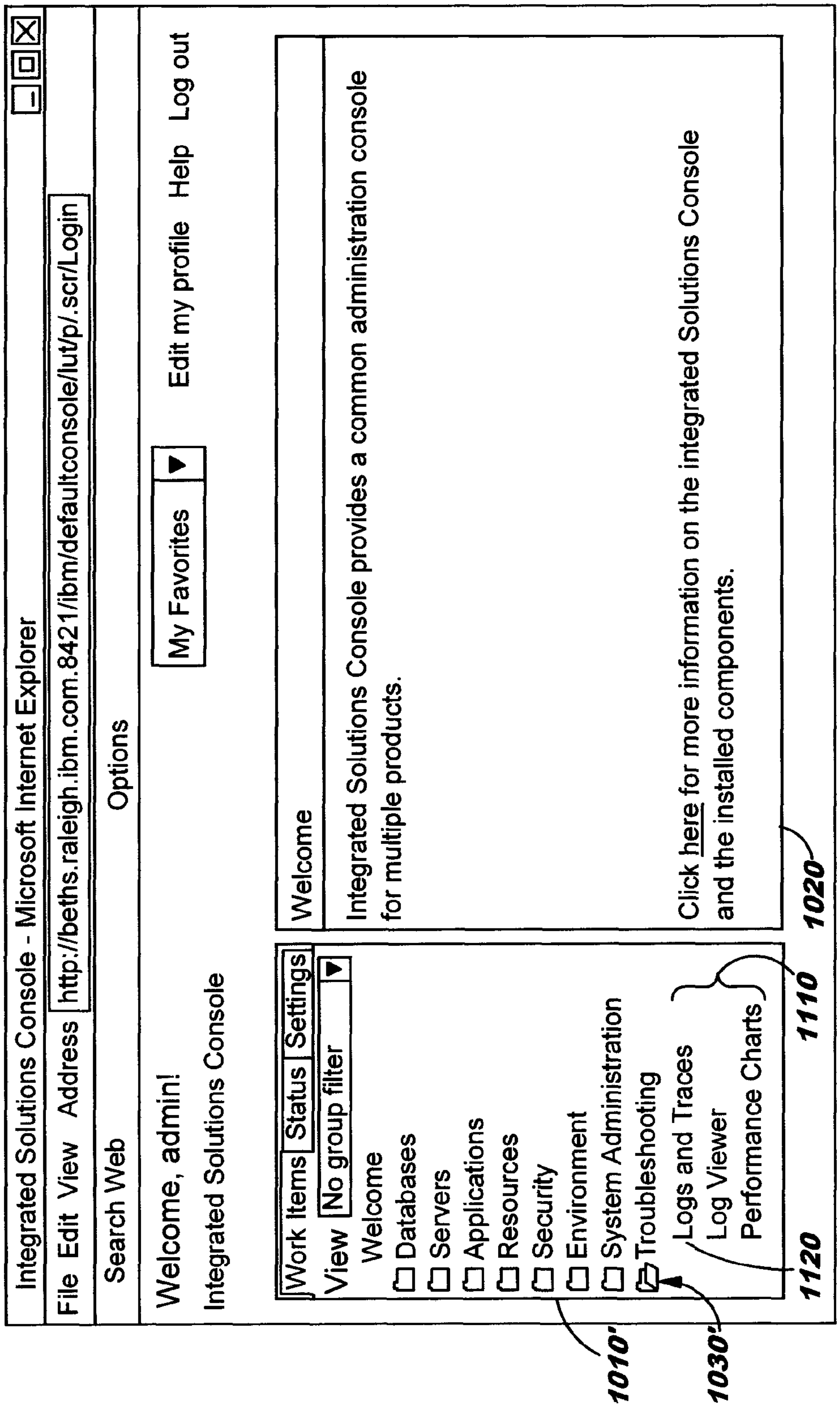
FIGS. 11-13 depict sample views that may be provided as an administrator interacts with a troubleshooting task, and illustrate use of multiple portlets, potentially developed for different resources and/or by different product development teams, within a view.
Figure 12:
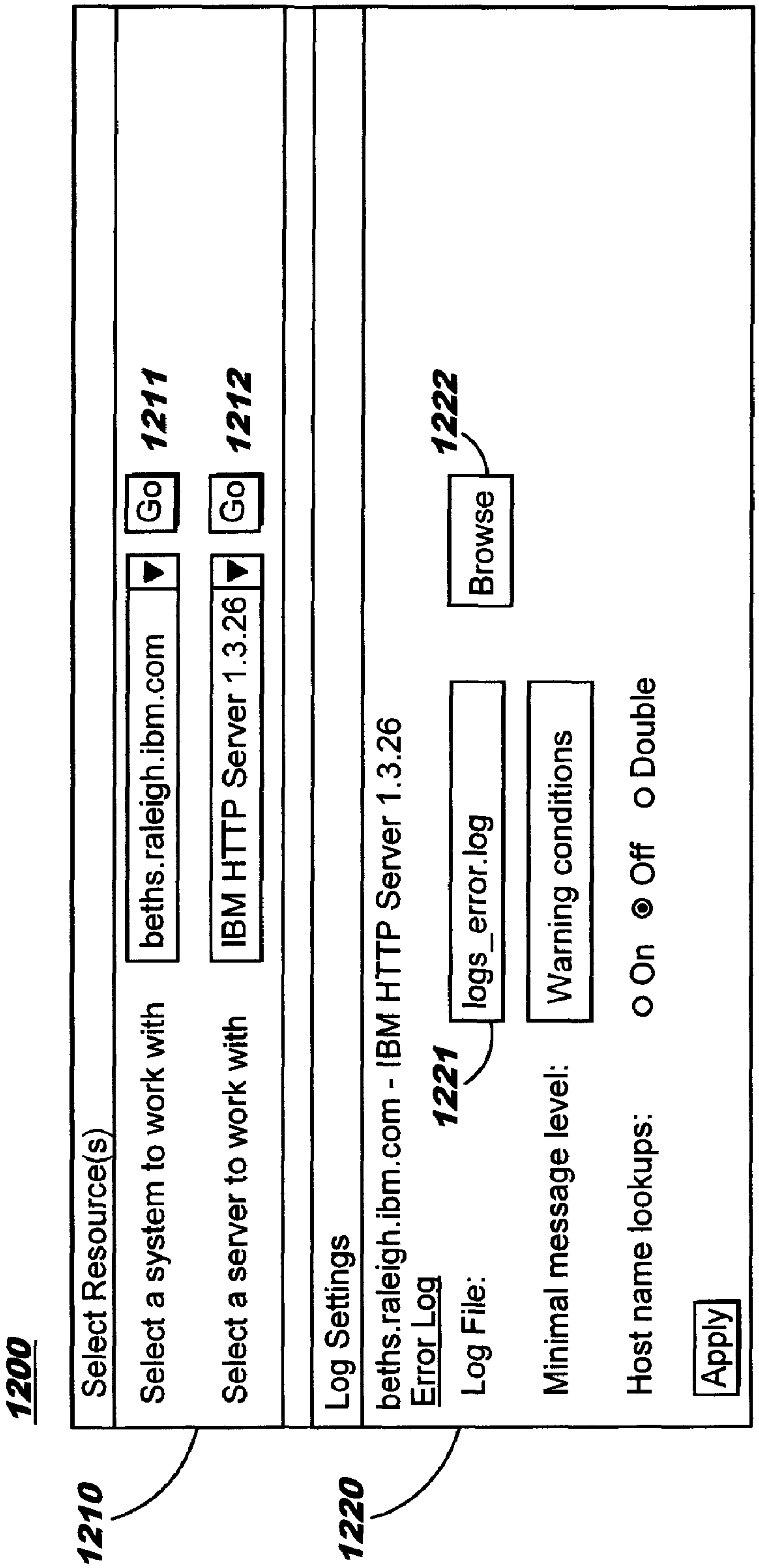
Figure 14:
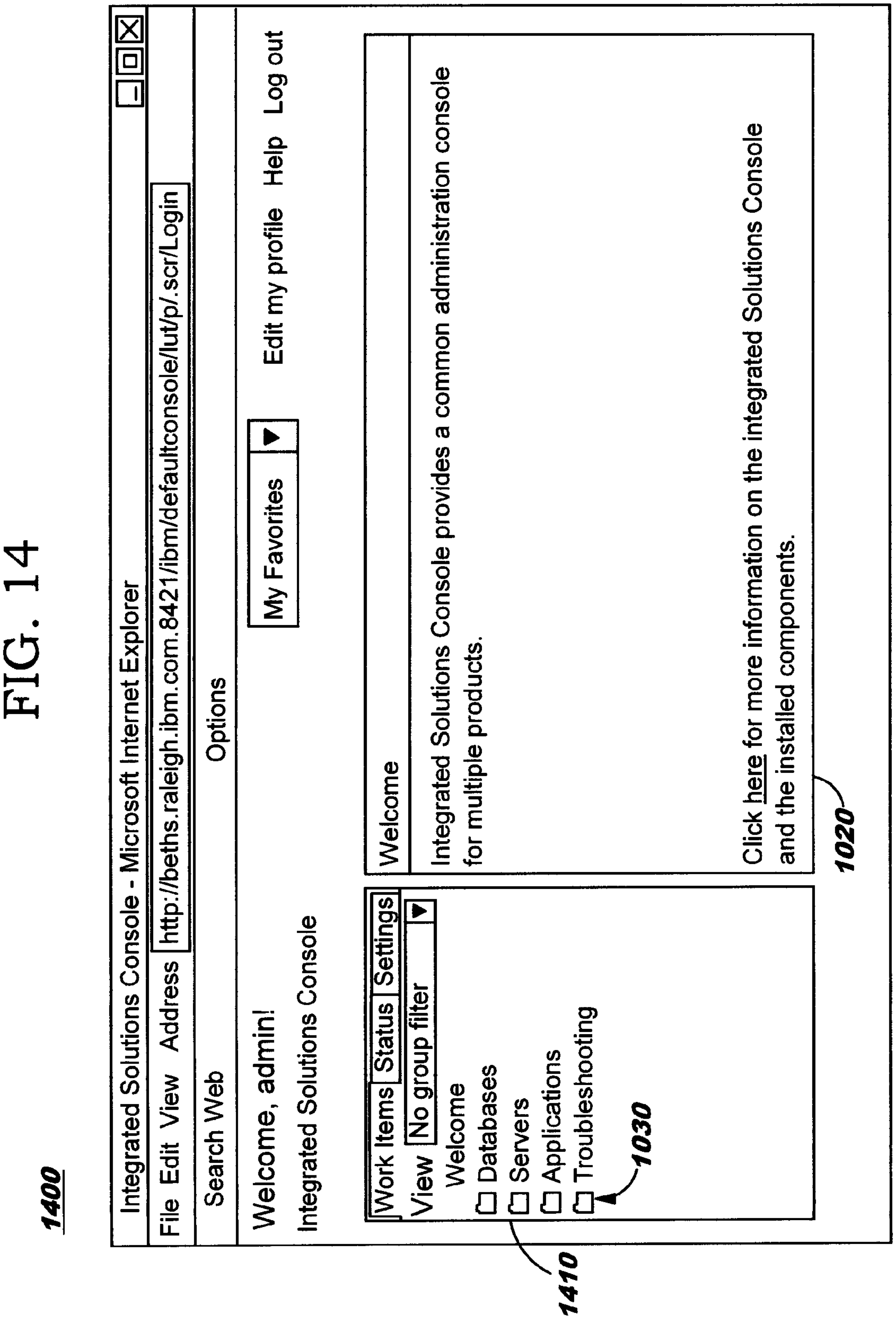
FIG. 14 provides a sample view showing how roles or permissions may be used to customize views.

FIG. 14 illustrates a result of this filtering approach, where in this example, screen 1400 is identical to screen 1000 of FIG. 10 except that the selectable task groups "Resources", "Security", "Environment", and "Systems Administration" have been omitted from navigation pane 1410. For example, with reference to omission of the Security task group, this may indicate that the present administrator is not authorized to view or alter security-related information. Or, it might indicate that this administrator has defined preferences that filter the Security task group so that it is not displayed in his or her navigation pane. Similarly, it may be that those tasks represent console functionality that the IT organization does not wish to utilize: by not including the task group on the navigation pane, access to the function is effectively removed for this IT organization's administrators, and the administrators' awareness of the function is also removed (unlike prior art consoles, where inaccessible functions may continue to be shown to administrators).

Other forms of filtering and searching can be used to modify the displayed navigation tree in navigation pane 1410. For example, an administrator may want to see a configured set of favorites, or all the pages associated with managing a particular server, or all the pages associated with a particular class of server tasks. Some of the filtering criteria may be included as attributes in the XML syntax that defines the page layout. (See the discussion of FIG. 26, below, for an example of this approach.) Other criteria might be derived in other ways, such as from a context associated with the current page. Thus, for example, a portlet on the page might allow the administrator to select a certain set of resources, and by pressing a button rendered on the portlet view, the navigation tree might be refreshed with navigation elements corresponding to the selected set of resources.

Figure 15:
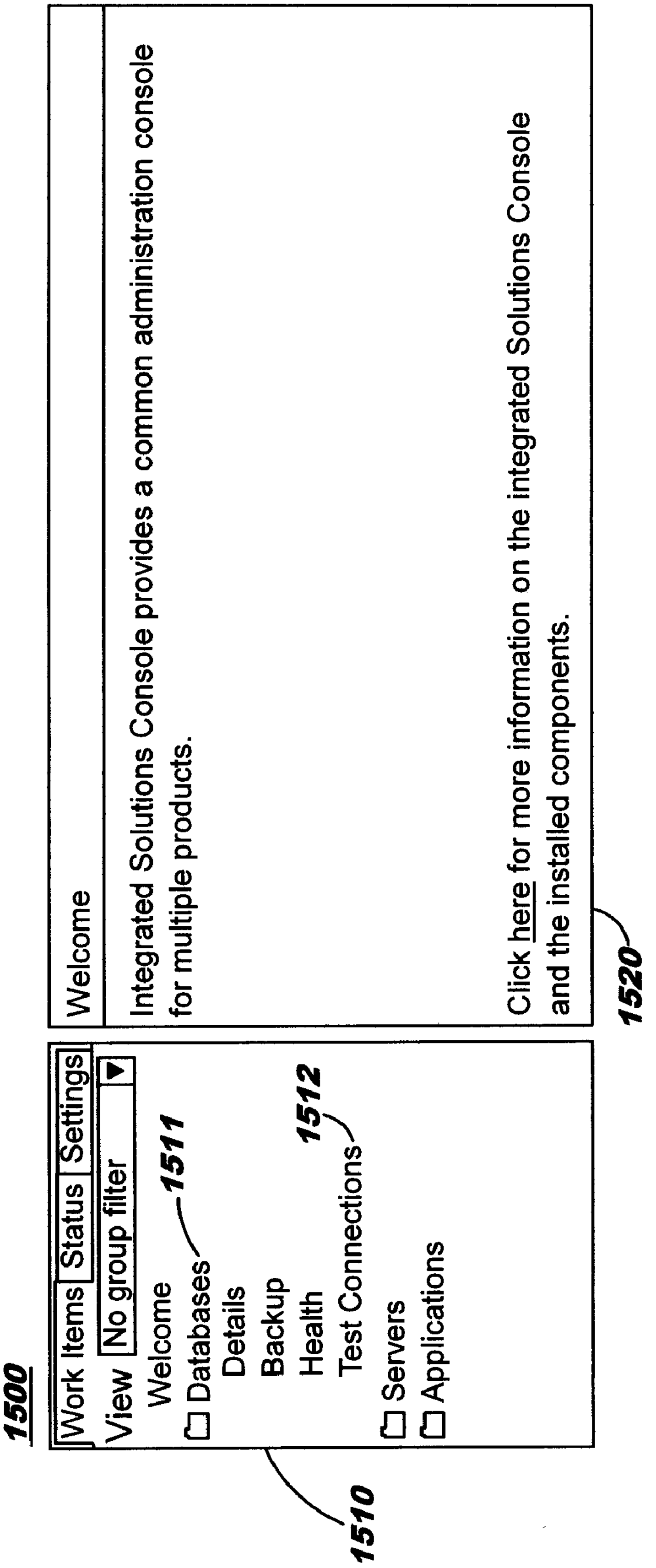
FIGS. 15-16 provide sample views showing how a single action may be requested for heterogeneous resources, and how multiple portlets can be represented within a single view.
Figure 16:
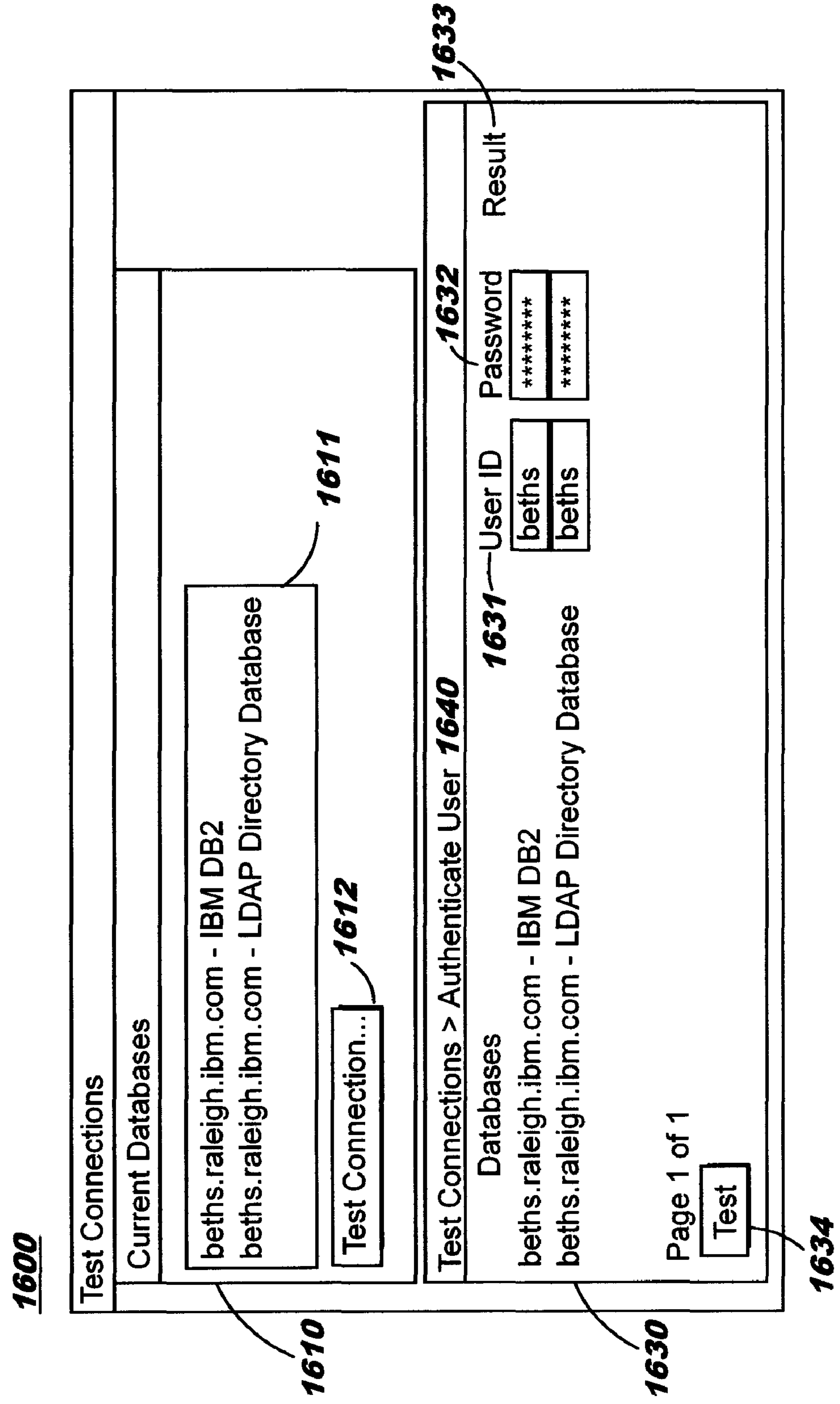

FIG. 15 illustrates how an embodiment of the present invention may be used to apply an action to heterogeneous resources. As shown therein in view 1500, a navigation pane 1510 presents a number of tasks that can be selected, and in this case, the Databases task folder 1511 has been expanded. Work area 1520 may present information such as a welcome to the administrator and/or general instructions for task selection/usage. Suppose that the administrator selects the "Test Connections" task 1512 that is available within the Databases task folder, indicating that he or she would like to test connections to one or more databases. Work area 1520 may then be replaced with content pertaining to that task, as shown by the sample content in FIG. 16 at 1600. In this example, the administrator is first presented with a "Test Connections" portlet view 1600 that includes a list 1611 identifying the available databases (as determined by a portlet which is responsible for making that determination, in preferred embodiments), enabling the administrator to select one or more databases of interest. Suppose that two databases are available, as shown in list 1611 (using two sample database identifiers), and that the administrator selects both of those databases. (Preferably, the administrator clicks on a representation of each resource of interest in order to select that resource when using various views in the console.) Further suppose, in this example, that the first database is a relational database and the second database is a directory database, and that the command used to test the connection to the relational database is different from the command used to test the connection to the directory database. Notably, view 1600 does not require the administrator to provide command syntax, or to learn command syntax that varies from one type of resource to another. Instead, the administrator simply selects the database by clicking on a rendering of its name or other identifying information (where this name or identifying information is preferably created when the database is configured, such that each database can be easily and uniquely identified). Portlets deployed according to the present invention mask these database-specific details from the administrator, thereby increasing efficiency and reducing user errors and confusion. Connections to back-end systems (such as database systems) may be provided, in one approach, using management beans created with JMX; in another approach, Web services technology may be invoked. In either case, the processing occurs transparently to the administrator.

List 1611 also shows how an action (discussed below with reference to graphical button 1612, in this example) can be easily applied to multiple resources, even though those resources are not homogeneous.

Consoles according to the present invention preferably provide one or more graphical controls, such as buttons, that can be activated to enable the administrator to apply an action to selected resources. Thus, in the example of FIG. 16, a "Test Connection" button 1612 is provided in view 1610, with which the administrator signals that selection of the databases in list 1611 is complete and that the connection test (i.e., the portlet functionality associated with this button) should begin. The content in portlet view 1630 is dynamically rendered, responsive to the selection made in portlet view 1610. In this example, view 1630 requests the administrator to provide his or her user ID and password for each selected database, where this information can be used to determine whether the administrator is authorized to issue commands to each selected database. See columns 1631 and 1632. This example also presents a "Test" button 1634, to be activated by the administrator after the user ID and password information has been entered, thereby triggering the test itself. A "Results" column 1633 is also presented, where results of the connection test to each database are preferably presented upon completion of the connection tests.

In preferred embodiments, a separate portlet may be deployed to log the administrator on to each of the selected databases, and each portlet may verify the user ID and password for its associated database. Or, other techniques (such as the WebSphere Portal server credential vault) may be used to minimize the need for the administrator to log on to back-end resources. Separate portlets may also be deployed to perform the connection test to each of the selected databases, and to then render a result (such as "Successful" or "Failed") in the Results column 1633. A "Failed" result may include links to other tasks to help resolve the cause of the failure, such as starting a stopped server or database. The content aggregation techniques disclosed herein enable specifying these various portlets that underlie the content views, and how those portlets interact with one another. For example, a portlet may be deployed that accepts the user's selections from list 1611 and that contains conditional logic to invoke different user-authentication portlets, depending on a programmatically-determined type of each selected database. Those user-authentication portlets then preferably identify their log-on requirements for presentation in view 1630 (in this example). Alternatively, the credentials may be retrieved from a credential vault and pre-populated in the view. Upon receiving the user ID and password, separate database-specific verifications may be performed by the portlets for the selected databases, after which results thereof are preferably returned for rendering in column 1633 as part of the consolidated view 1630. The administrator, however, perceives the separate verifications (i.e., authentications) as a single action, where aggregated view 1630 consolidates the administrator's perception of the separate back-end processes that are to be performed (and a single heading 1640 is preferably used to describe the action to be performed). Note further that these back-end processes are dynamically identified, depending on which resources the administrator selects from a representation such as that illustrated at reference number 1611.

Figure 17:
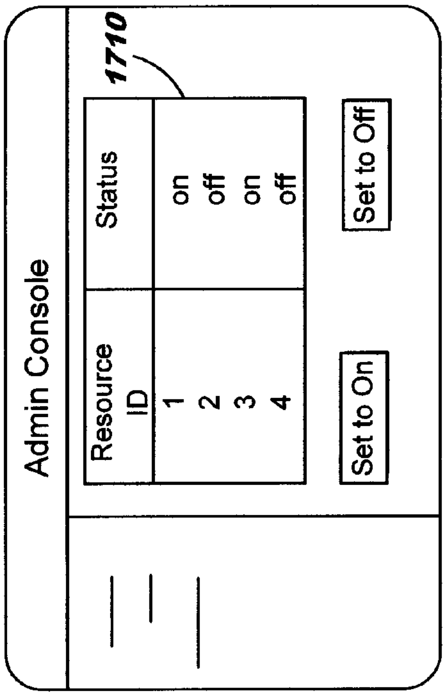
FIGS. 17-18 provide an example showing how the flexible configurability of embodiments of the present invention allows advantageous customization.
Figure 18:
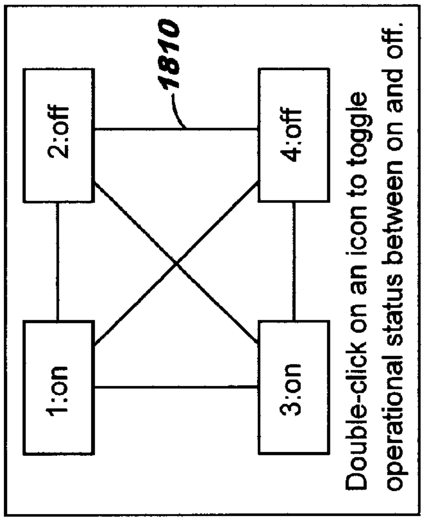

FIGS. 17-18 provide another example showing how the flexible configurability of embodiments of the present invention allows advantageous customization. In this example, the customization pertains to selection of a particular type of view element. In FIG. 17, a tabular representation 1710 is used in page 1700 to present current status of a selection of resources. Assume, for purposes of illustration, that a portlet has been deployed that creates this tabular representation, and that an alternative portlet is available to present analogous information using a graphical approach in a network topology chart. The present invention enables this alternative representation to be rendered simply by altering an XML document that identifies which of these portlets renders content into this page 1700. Table 1710 can thus be replaced by network topology chart 1810 in FIG. 18, if desired. (Refer to the discussion of FIGS. 5 and 8, above, which explain how one portlet can be easily substituted for another by modifying an XML document.) In addition, a console module that does not contain portlets might be made available in some circumstances. For example, a console module may be created with the same page content definition except that a static image or other content source may be substituted for the portlet. The administrator may then be allowed to choose among the page definitions.

Turning now to FIGS. 19-25, flowcharts are provided depicting logic that may be used when implementing embodiments of the present invention.

Figure 19A:
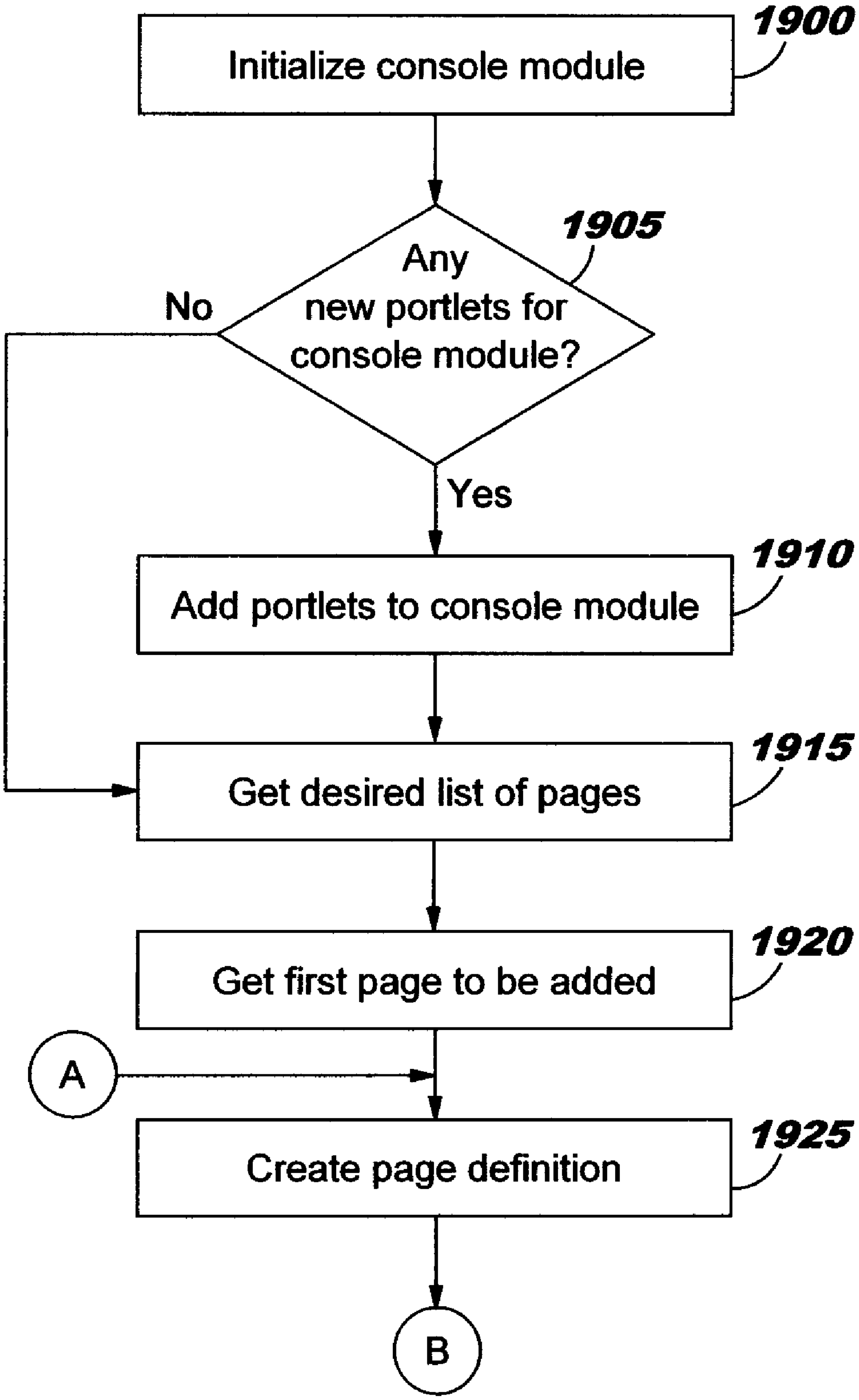
FIGS. 19-25 provide flowcharts depicting logic that may be used when implementing preferred embodiments of the present invention.
Figure 19B:
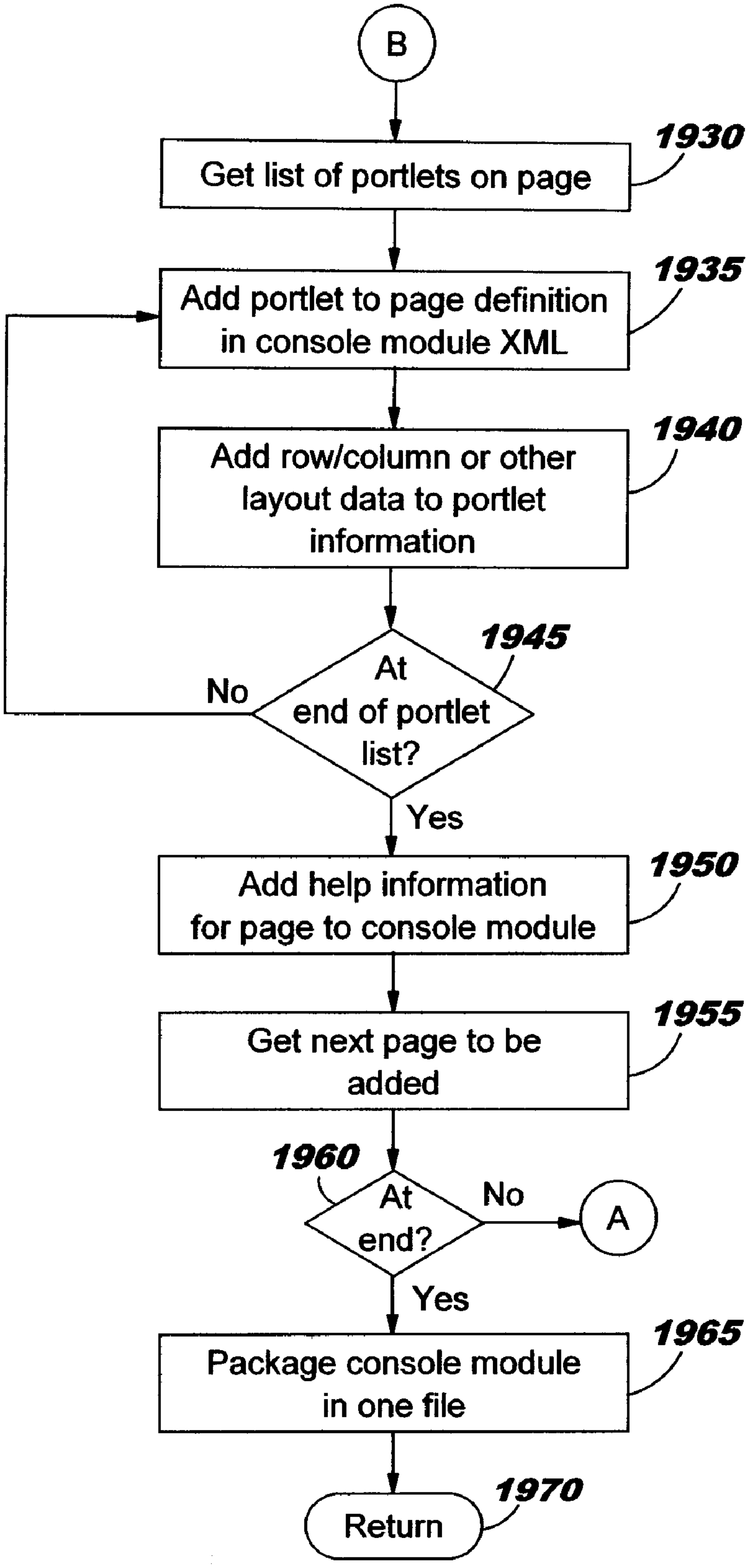

FIG. 19 depicts logic for creating a console module. In Block 1900, a console module is initialized. Block 1905 tests to see whether there are any new portlets for this console module. If not, control transfers to Block 1915; otherwise, at Block 1910, the new portlets are added to the initialized console module.

Block 1915 obtains the desired list of pages for this console module. The desired list might be determined, for example, by a content designer or a solution designer such as a system integrator. In Block 1920, the first page from this list is obtained, and a page definition is created for that page at Block 1925. In preferred embodiments, the page definition is created using XML syntax, and includes a specification of the page title and its navigation elements for placement in a navigation pane. The page definition may also include a specification of access rights (e.g., identifiers of the users and/or user groups who are authorized to access tasks from this page) and/or filtering criteria keywords that can be compared to administrator preferences. See the discussion of FIG. 26, below, for more information on how this information might be provided in a sample XML document.

The portlets to be included on this page are then determined (Block 1930). As stated earlier, embodiments of the present invention allow creating layouts for pages/tasks using portlets that are in that particular console module as well as portlets that are provided in other console modules. Block 1930 may therefore use portlets located in various modules. Block 1935 adds one of these portlets to the XML specification of the page definition. (See, for example, reference numbers 513, 514 in FIG. 5A, where the "ref" attribute of a <portlet> tag identifies a portlet included in a page layout 510.) In Block 1945, row/column or other appropriate layout data is added to the portlet information. (In the example in FIG. 5A, a <row> element 512 is used for the <portlet> tag 513 specified in this  element 511.) Other types of layout data might include tables, charts, graphs, and so forth.

Block 1945 tests to see whether all portlets in the portlet list obtained at Block 1930 have now been processed. If not, control returns to Block 1935 to begin processing another of the portlets. When all portlets have been added to the page definition, similar processing is preferably performed for the Help content that is to be provided with this page. Block 1950 therefore indicates that Help information for the page is added to the console module.

Block 1955 then obtains the next page (if any) to be added to this console module. If there are no more pages to add, then the test in Block 1960 has a positive result (i.e., processing of the page list obtained at Block 1915 is at the end), and at Block 1965, the page definition is packaged in one file that pertains to a particular console module. This iteration of the logic of FIG. 19 then exits (Block 1970). Otherwise, when more pages are still to be processed (i.e., when the test in Block 1960 has a negative result), control returns from Block 1960 to Block 1925, where creation of the page definition for that page begins.

Notably, a system integrator can use the approach shown in FIG. 19 to create new pages for business processes using portlets from a range of console modules. A console module that provides a rearranged view of a previously-defined console module might then contain only help and page layout syntax, for example, while referring to content-creating portlets in another console module.

Figure 20:
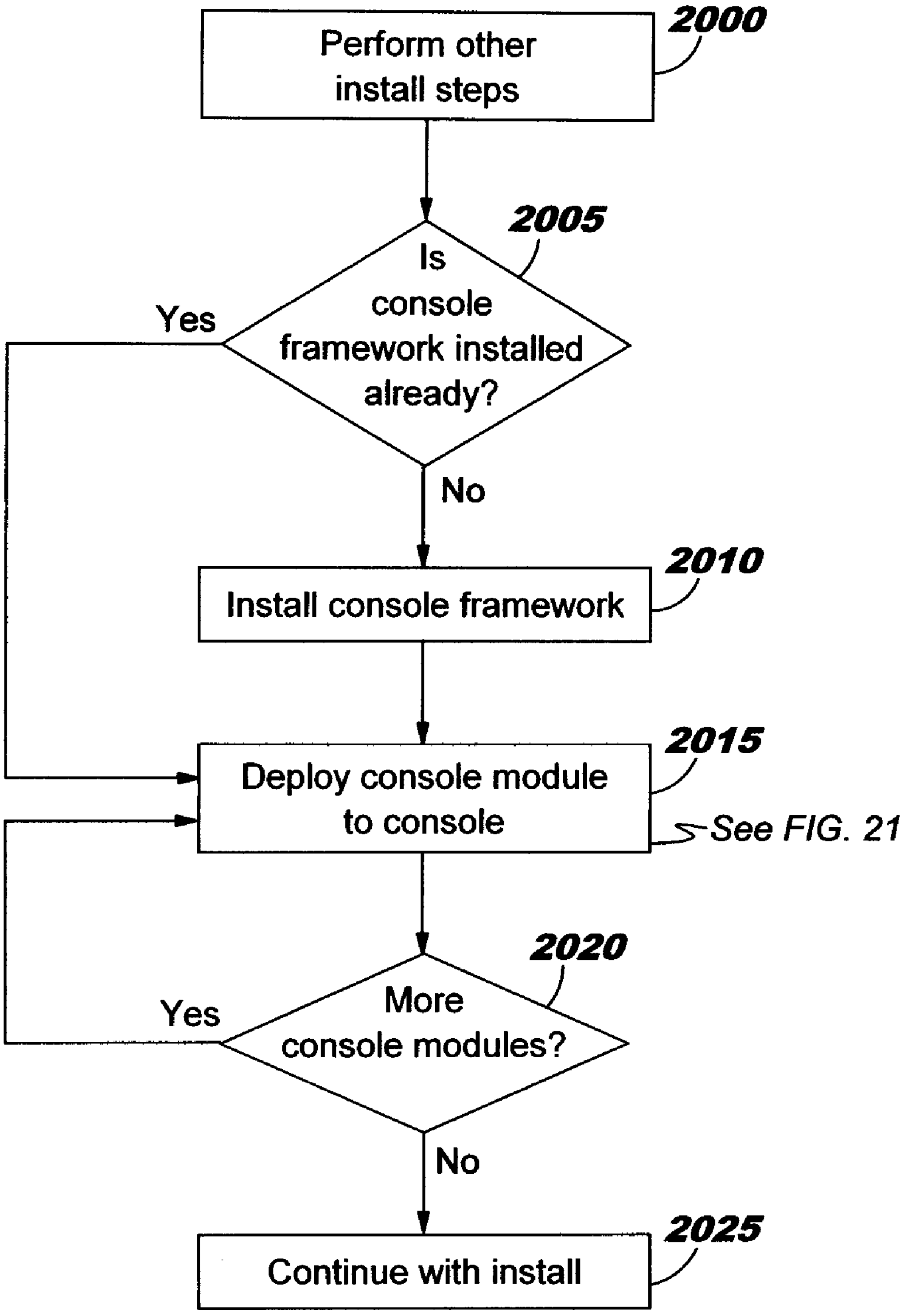

FIG. 20 depicts logic describing installation of a product (or other resource) that includes one or more console modules. A number of prior art install steps may be performed (Block 2000), and installation processing that pertains to the present invention then begins (Block 2005) by checking to see if a console framework is already installed. If it is, then control transfers to Block 2015; otherwise, the console framework is installed (Block 2010), preferably using prior art techniques.

At Block 2015, a console module for this product is deployed to the console. (Refer to the discussion of FIG. 21, below, where this is described in more detail.) Block 2020 then checks to see if there are more console modules for this product. If so, the processing of Blocks 2015-2020 is repeated until all console modules have been deployed. Any remaining prior art product installation steps are then performed (Block 2025) to complete the product installation. In this manner, content in the console grows dynamically. (Similarly, content in the console may shrink dynamically during an uninstall, which preferably proceeds in an analogous manner to that of the install process shown in FIG. 20.)

Figure 21:
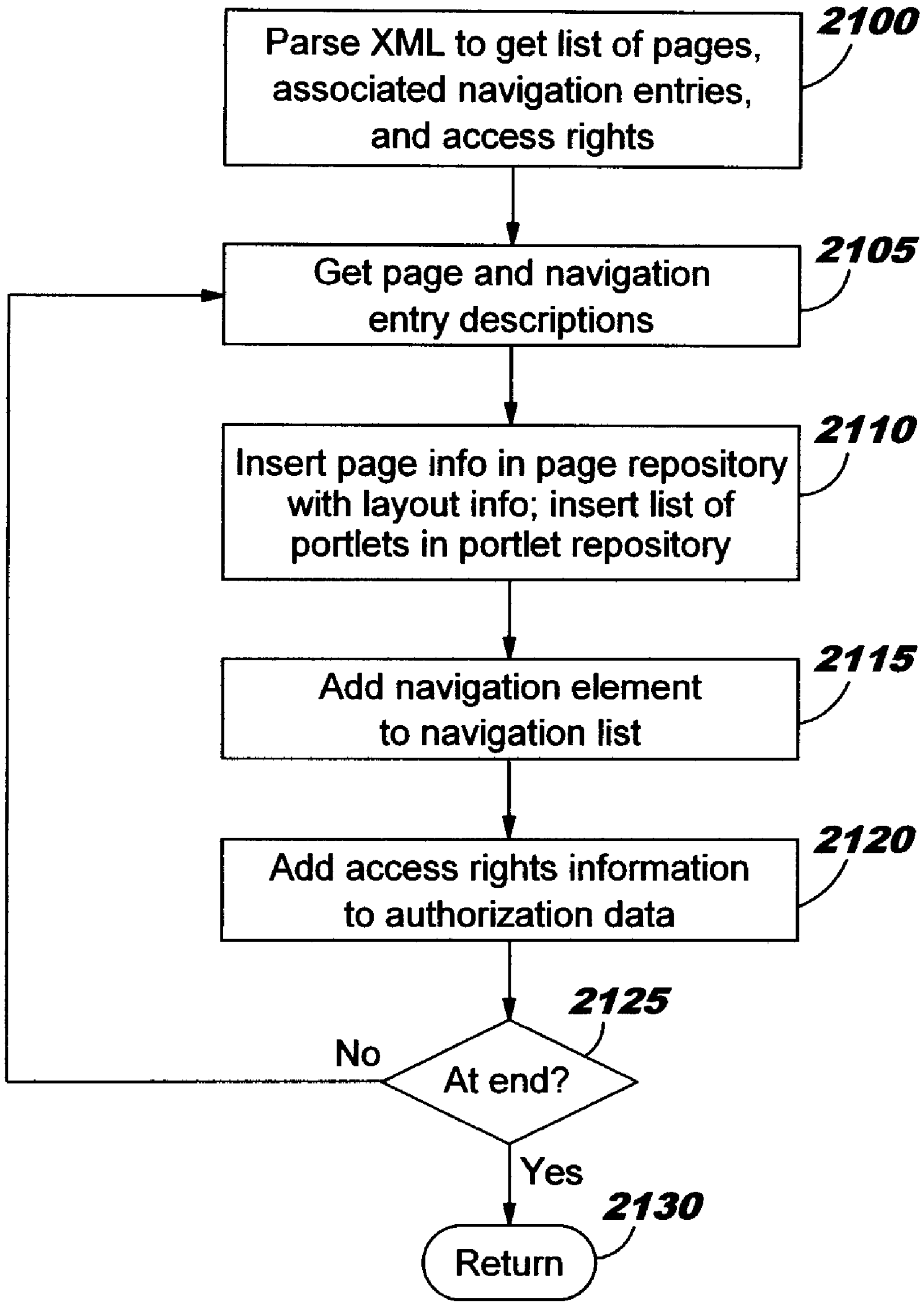

FIG. 21 provides a flowchart illustrating logic that may be used when a console module is deployed. The XML page definition is parsed (Block 2100), thereby determining the list of pages for this module, the associated navigation entries to be used in a navigation pane of the console, and any specified access rights and/or filtering criteria keywords. Block 2105 obtains a page from the list, along with its navigation entry descriptors, access rights, and/or filtering criteria keywords, and at Block 2110, a list of the portlets for this page is inserted into a portlet repository and the page information and layout information for the page are preferably inserted into a page repository. (Refer to FIG. 5 for examples of how various layout styles might be specified for portlet content to be rendered.) The navigation element obtained in Block 2105 is added to a navigation list (Block 2115), and at Block 2120, the access rights and/or filtering criteria keyword information (if provided) is preferably added to a table or other repository that stores authorization/filtering information for use in determining whether the task will be presented as a selectable choice to particular administrators. Block 2125 then checks to see if the list of pages obtained in Block 2100 has been completely processed. If not, control returns to Block 2105 to begin processing another of the page definitions for this module; otherwise, this iteration of the logic in FIG. 21 exits (Block 2130).

Figure 22:
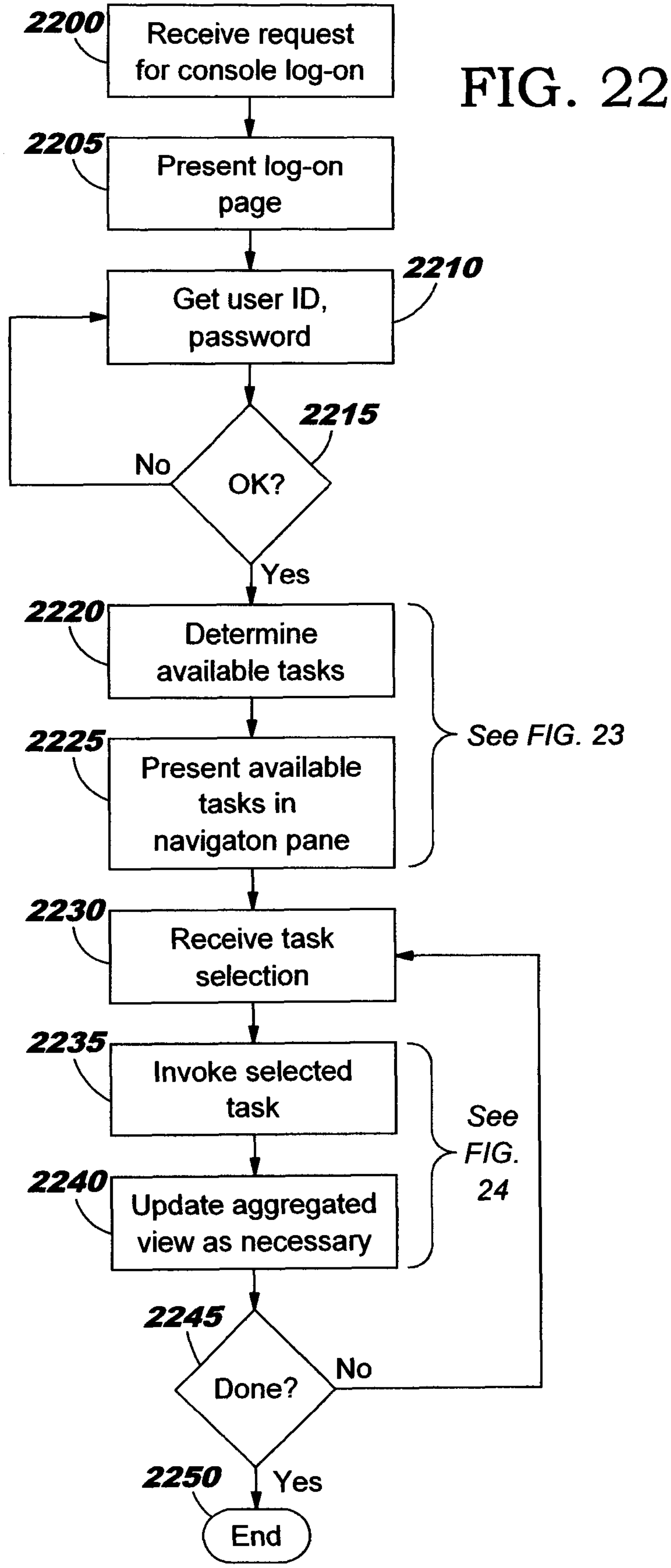

FIG. 22 illustrates how an administrator's log-on request may be processed, providing a role/permission-specific aggregated view. (Refer also to the discussion of FIG. 9, above, regarding the log-on process.) In Block 2200, the log-on request is received. In preferred embodiments, this corresponds to receiving a request for the Web-accessible console (e.g., by receiving a Hypertext Transfer Protocol, or "HTTP", request message that specifies a Uniform Resource Locator, or "URL", identifying the console). In response, a log-on page is returned and rendered (Block 2205), preferably using a client-side browser or similar application. Block 2210 indicates that the administrator's user ID and password are obtained, and in Block 2215, a test is made to determine whether that information identifies an authorized administrator. (Techniques for validating a user ID and password are well known, and are not discussed in detail herein.) If this test has a negative result, then control may return to Block 2210 (e.g., to provide another opportunity for entering a valid user ID/password combination); or, processing may exit from FIG. 22, preventing the unauthorized administrator from using the console. Otherwise, when the test in Block 2215 has a positive result, then processing continues at Block 2220.

In Block 2220, the role/permission information associated with the entered user ID/password is used to determine the tasks for which this administrator is authorized. A console presenting those tasks is then rendered (Block 2225), as described in more detail below with reference to FIG. 25. (See also FIG. 23, where a flowchart is provided depicting logic that may be used to create a navigation pane customized to this administrator's access rights and/or filtering preferences. FIG. 26 provides a sample page definition document where access rights and filtering criteria have been specified as design-time information.)

Figure 24:
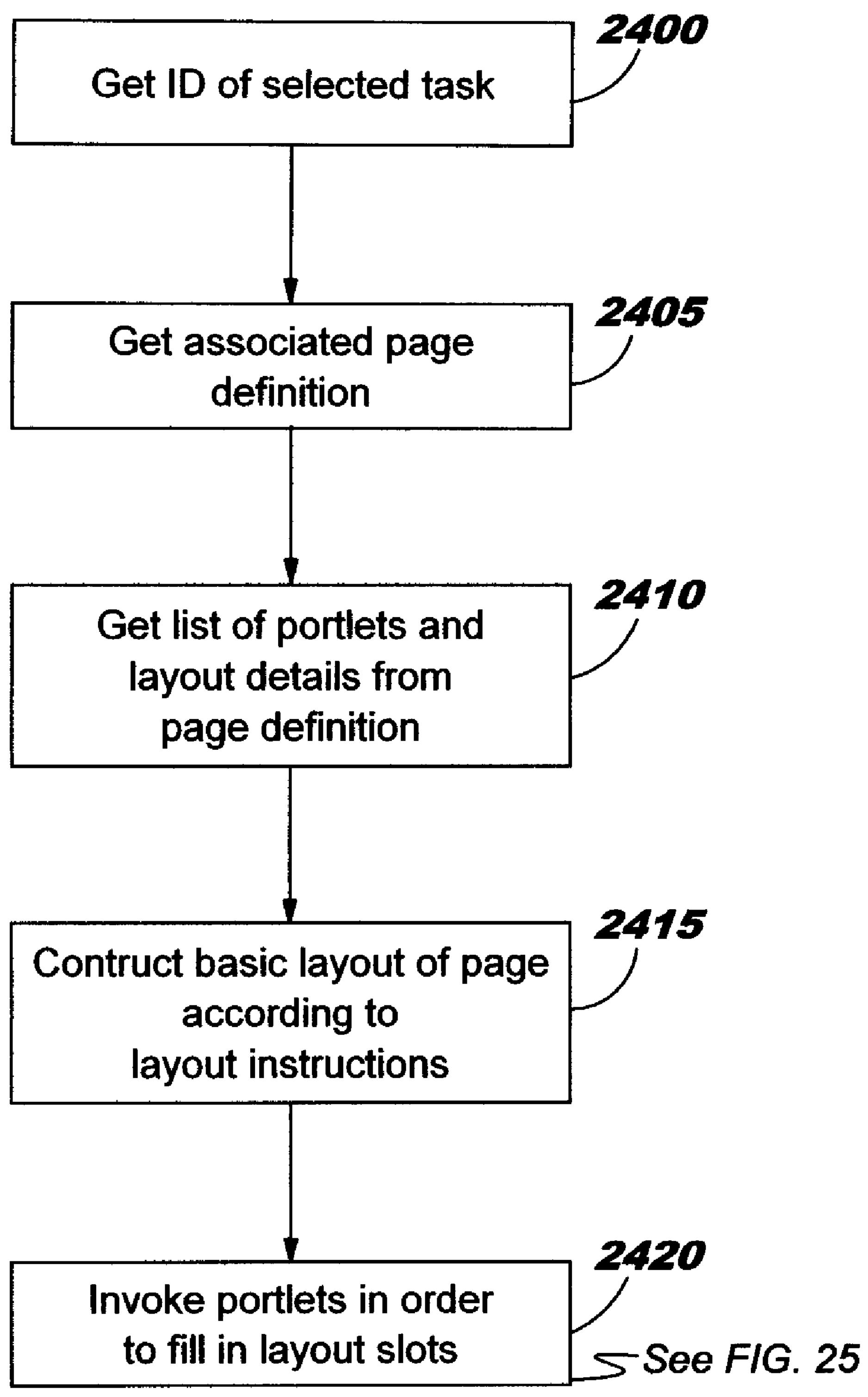

The administrator may then select a task (Block 2230), for example by making a selection from a navigation pane (or from another displayed view, such as a work area, where a task selection portlet may underlie this view according to preferred embodiments). The task corresponding to that selection is then invoked (Block 2235), and if appropriate, the view may be updated responsive to the task execution (Block 2240). For example, if the task requests information retrieval, such as a status query to be executed for selected resources, then the console may be updated at Block 2240 to present the retrieved information. (The flowchart in FIG. 24 provides more information about building an aggregated page, responsive to selecting a task, and is discussed below.)

Block 2245 then tests to see whether the administrator has finished executing tasks (where this may be indicated, for example, by pressing a "Logout" button). If so, then the processing of FIG. 22 exits (Block 2250); otherwise, control returns to Block 2230 to await the administrator's next task selection.

Figure 23:
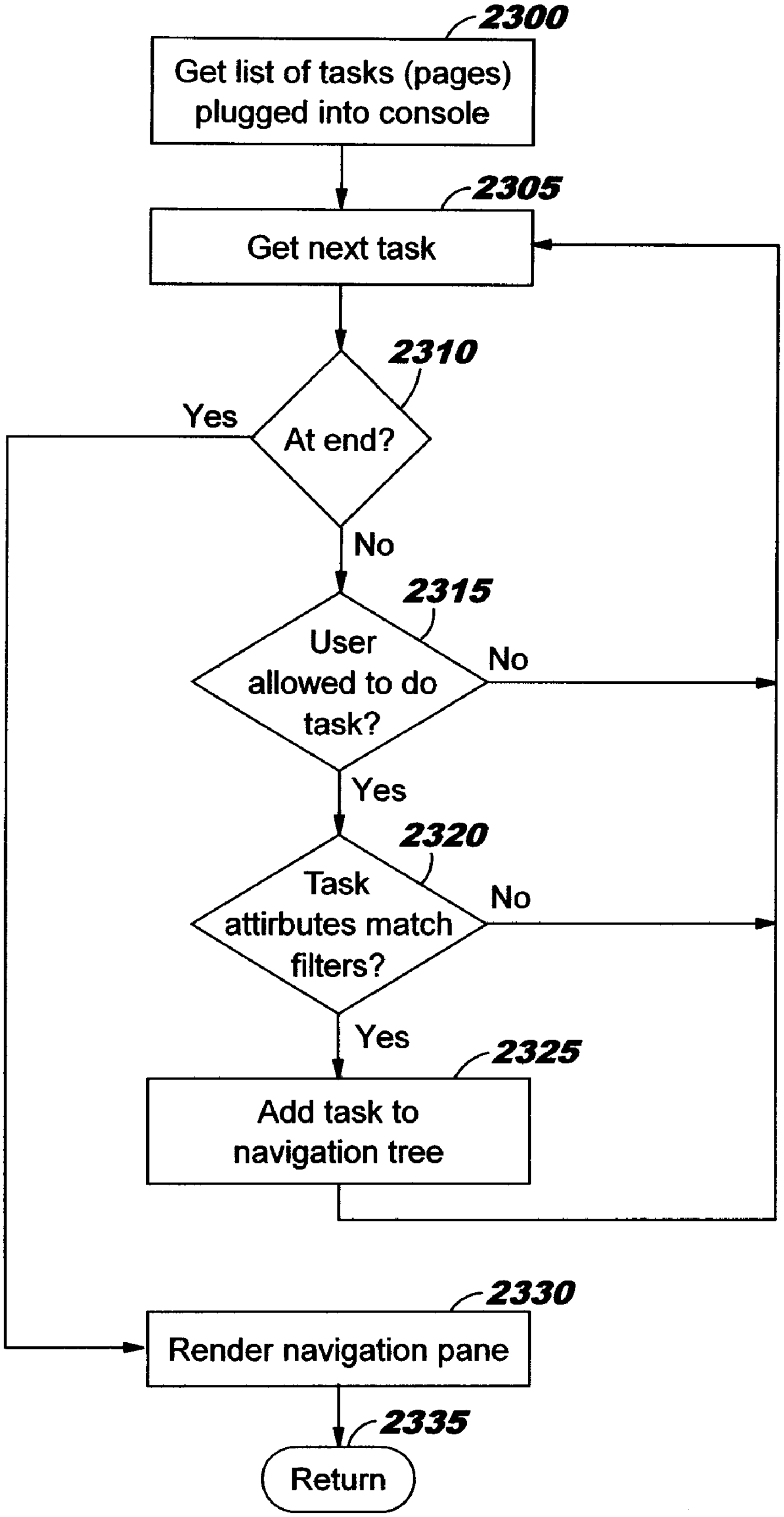

FIG. 23 illustrates how a navigation tree may be dynamically created, according to preferred embodiments, to depict entries only for those tasks for which the present administrator is an authorized user. In addition, filtering criteria (which may be administrator-specific preferences) may be used to further customize the navigation tree. Or, an implementation of the present invention may be adapted to support customization according to either of these techniques individually. (Refer to the description of Block 2320 and also of FIG. 26, below, for more information on using filters.)

In Block 2300, the list of tasks or pages currently plugged in to the console is determined. Block 2305 obtains the next task from this list, and Block 2310 checks to see if this task list is already at the end. If so, then control transfers to Block 2330, where the navigation pane that has been constructed is rendered, and processing then exits from FIG. 23 (Block 2335); otherwise, processing continues at Block 2315.

Block 2315 checks to see if this administrator is allowed to perform this task. (Preferably, the access rights information described above with reference to Blocks 2100 and 2120 is used in this operation.) If the administrator is not authorized, then control returns to Block 2305 to obtain the next task from the task list. Otherwise, processing continues at Block 2320, which checks to see if the task's attributes match any currently-active filtering criteria. For example, a particular administrator might specify filtering criteria such as "only database functions" or "only tasks associated with Server X", thereby limiting entries rendered in the navigation tree to a manageable, useful set (as determined by the administrator). Filtering criteria keywords may be specified in the XML page definition syntax for a page, as a type of page attribute, as discussed in more detail below with reference to the example in FIG. 26. The filtering criteria keyword(s) associated with each page is/are preferably stored in a table or other repository (e.g., during the processing of Block 2110 of FIG. 21), and a particular administrator may define the keywords of interest as administrator-specific preferences. Accordingly, the test in Block 2320 compares keywords/attributes associated with this task to the currently-active filtering preferences. If there is a match, then processing continues at Block 2325; otherwise, control returns to Block 2305 to begin evaluating the next task.

Upon reaching Block 2325, the task is one for which the administrator is authorized, and for which the currently-active filtering preferences are matched. Block 2325 therefore adds this task to the navigation tree for the console, and control then returns to Block 2305 to process the next task (if any).

FIG. 24 depicts logic that may be used to build an aggregated page for rendering to the administrator, and provides more detail regarding Blocks 2235-2240 of FIG. 22. When the administrator selects a task, an identifier associated with that task is obtained (Block 2400) and used to retrieve an associated page definition (Block 2405). For example, with reference to the page definition 500 in FIG. 5, if the administrator double-clicked on a rendering of the text "One Row" in a navigation pane, this text might represent a task that renders its content in a single-row format by invoking a portlet having the identifier shown at reference number 514 in FIG. 5A, and the page definition defined at reference number 510 might therefore be retrieved responsive to selection of the "One Row" text.

Block 2410 then obtains the list of portlets in this page definition, along with details specifying their layout. This information is used in Block 2415 to construct a layout for the page, and the portlets are then invoked at Block 2420. As discussed in more detail with reference to FIG. 25, the portlets are invoked in the order in which they are specified in the page definition, thereby creating content that will be used to fill in the slots of this layout.

Figure 25:
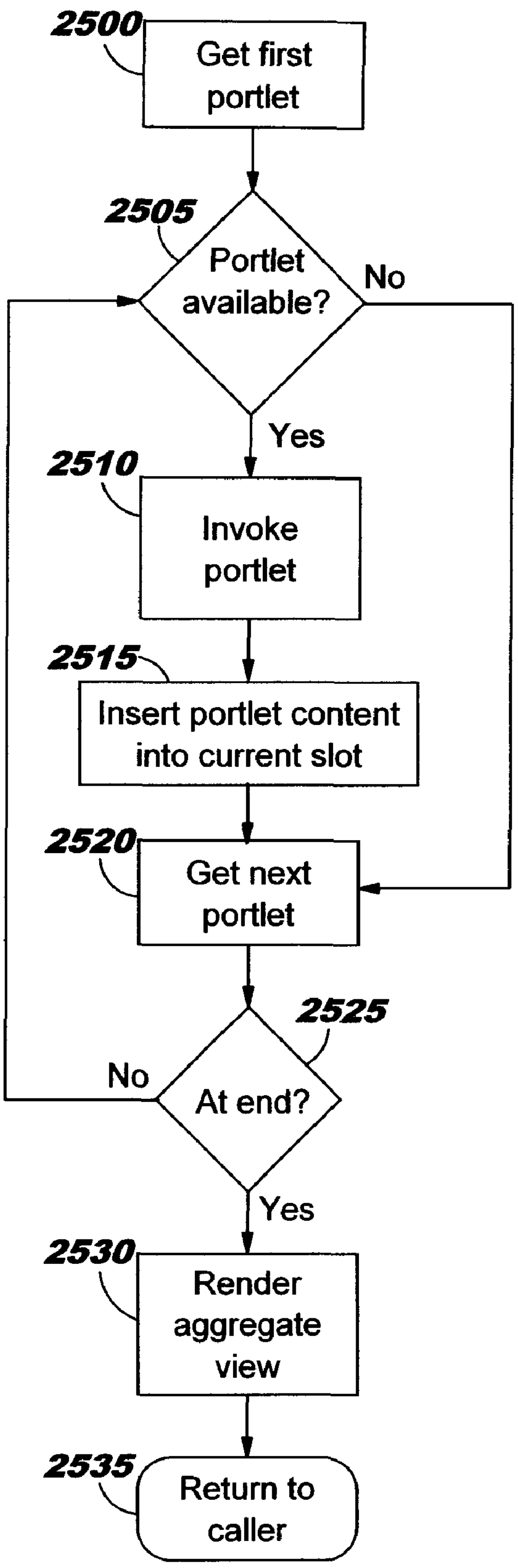

FIG. 25 provides further details pertaining to the presentation of a console view having an aggregation of content from one or more portlets. As shown therein, the first portlet to be represented within a view is determined (Block 2500). Preferably, this comprises evaluating syntax in the XML document that specifies the portlet(s) for a selected view. For example, if the view to be presented has a unique identifier, or "uid", value of "com.ibm.isc.samples.layout. 2colsw2rows_pg", which appears as an attribute of the  tag shown at reference number 540 in FIG. 5, then the first portlet (in this example) has the identifier "com.ibm.isc-.samples. layout.A_Portlet". See the <portlet> tag at reference number 545.

Block 2505 makes a dynamic determination as to whether this portlet is available. Embodiments of the present invention enable specifying a page layout where some functionality represented therein may or may not be available in a particular implementation—or the present administrator may or may not be authorized to use some of the specified functionality. Accordingly, the test in Block 2505 has a positive result if the portlet is available for use by this administrator. In that case, processing continues at Block 2510, which indicates that this portlet is invoked. The content created by the portlet's execution is then inserted into the current slot of the aggregated view (Block 2515). Each portlet's content may be added to a table widget, for example. (For reference number 545, the content of the first portlet is used for the upper left cell in a layout having two columns and two rows, as discussed above with reference to FIG. 5.) Processing then continues to Block 2520, which is discussed below.

As mentioned with reference to Block 2505, a page layout may specify portlets that are not currently available in a particular IT environment. Preferred embodiments of the present invention enable programmatically learning of new portlets that are available for rendering content into the aggregated console, including such previously-unavailable portlets. For example, if products are added to an existing IT environment, a console as disclosed herein may automatically incorporate content from one or more console modules that are deployed during installation of those products. Preferably, the content aggregation techniques use conditional logic to search in the portlet repository for the portlets defined in the page definitions to determine whether references to specified portlets can be completed, and if not, the corresponding view area is left empty (or, in an optional aspect, this area may be made available for content of other portlets which are currently available). When a referenced portlet subsequently becomes available, its content can then be automatically merged into the aggregated view, according to the page definition. Use of content aggregation techniques, as disclosed herein, enables this automatic merging to occur in ways not necessarily envisioned by the content developers. (Note that entries in the navigation pane may also be updated dynamically to reflect availability of portlets providing new or additional tasks. See the discussion of FIG. 23.)

Returning to the discussion of FIG. 25, Block 2520 obtains the identifier of the next portlet to be invoked for the selected view, if any, and Block 2525 tests to see whether the page definition is at its end (in which case a portlet identifier was not found by Block 2520). Again referring to reference number 540, it can be seen that there is another <portlet> tag 546, and thus the test in Block 2525 has a negative result. Accordingly, control then returns to Block 2505, which checks to see if that portlet is available. (As will be obvious, the portlets may be invoked without waiting for a previously-invoked portlet to complete its execution; FIG. 25 depicts a sequential invocation for ease of illustration.)

When the test in Block 2505 has a negative result, then a portlet that is specified in the page layout syntax for this view is not available for rendering content to be aggregated into the view. Accordingly, that portlet's view area may be left empty, or may be reused by other portlets, as discussed above. (See, also, the discussion of FIG. 6.) Control therefore transfers from Block 2505 to Block 2520, which checks to see if other portlets are specified for this view (effectively skipping over the reference to the unavailable portlet).

When the test in Block 2525 determines that there are no more portlets specified for this view (i.e., the test has a positive result), processing continues at Block 2530, where the aggregated view resulting from invocation of the available portlets is rendered. Control then returns to the invoking logic (Block 2535), where the administrator may (if desired) perform further interactions with this view.

Turning now to FIG. 26, a sample markup language document 2600 is provided to illustrate how navigation elements, access rights, and filtering criteria keywords may be specified. Each of these will now be described in more detail with reference to the provided sample document.

In sample document 2600, two highest-level entries 2610, 2620 for a navigation pane are defined. These entries 2610, 2620 may be considered as folder-type entries, in that they serve as containers for other lower-level entries. For example, the value of the <title> element in entry 2610 is "view", and the value of the <title> element in entry 2620 is "admin_assets". These text strings are preferably rendered in a tree-structured navigation pane as siblings. The "view" entry has been defined with a single child element titled "license"; see reference number 2615. The "admin_assets" entry has a single child element titled "inventory" 2625, which in turn has four child elements titled "userid" 2635, "address" 2645, "location" 2655, and "users" 2665. See FIG. 27 for a sample navigation pane 2700 containing these entries.

Note that the page definition syntax provided in document 2600 for each of the leaf nodes 2615, 2635, 2645, 2655, 2665 of the tree-structured navigation pane includes a specification of at least one portlet that is to be invoked when the administrator selects the task associated with that leaf node (e.g., by double-clicking on the text of an entry from navigation pane 2700).

Figure 27:
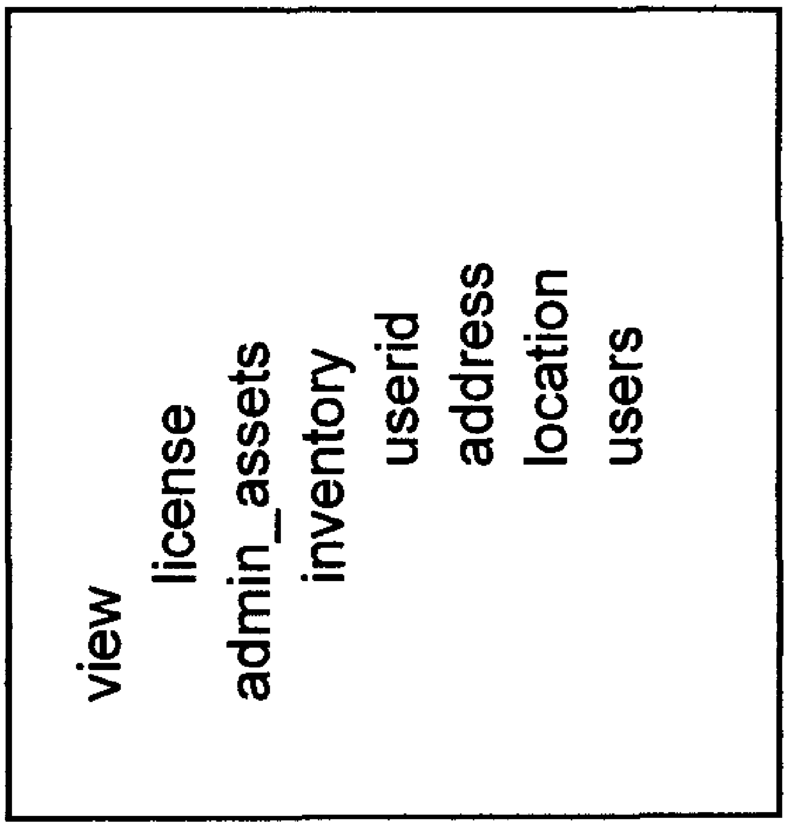
FIG. 27 depicts a sample navigation pane constructed using information from the sample document in FIG. 26.

Sample document 2600 also illustrates one way in which access rights may be specified in a page definition document. An <access-control> element is used, in this example syntax, to identify roles of users who are permitted to access pages or groups of pages. See reference numbers 2612, 2622, 2662. Reference number 2612 indicates that users having a role of "Administrator" are permitted to invoke the page titled "license" 2615. Reference number 2622 indicates that users having a role of either "User" or "Administrator" are permitted to invoke the page titled "admin_assets" 2621 (which is a folder containing lower-level tasks, as shown in FIG. 27). In each case, a <role> tag includes a "permit" attribute that has, as its value, a group name for the role that is permitted to access the task. As an alternative, the <role> tags in element 2662 may be used to override the role information specified at 2622. In this example, element 2662 specifies that users in the "Administrator" role are permitted to have access to the "users" page (and its associated portlet 2668), while those users in the "User" role are excluded from accessing this page. (For example, this access rights information may be designed to prevent end users from modifying specifications of users and their roles.)

Filtering criteria keywords are illustrated in sample document 2600 at reference numbers 2618, 2623, and 2628. A <keyword> attribute is used, in this approach, to specify one or more filtering criteria values that are to be associated with a page or group of pages. Accordingly, the attribute value "security" at reference number 2618 indicates that the "license" choice 2615 should be rendered only for administrators when "security" is an active filtering preference. The comma-separated list "lan, security" specified at reference number 2623 indicates that the "admin_assets" node and its children are only to be rendered for administrators when either "lan" or "security" is an active filtering preference, and the value "lan" at reference number 2628 indicates that the "inventory" node and its children should only be rendered for administrators when the active filtering criteria indicate that this administrator is interested in tasks having the keyword "lan". As will be obvious, this is merely one approach that may be used for specifying filtering criteria keywords.

Optionally, an embodiment of the present invention may be adapted for using wild cards, whereby a particular administrator may specify that he or she is interested in viewing all tasks without regard to the keywords associated with any particular task. Or, in another approach, the absence of filtering criteria associated with an administrator may be implemented as if a wild card approach was specified. When using a wild card approach, administrators are not required to know the keywords, or to specifically configure preferences, to enable selectable representations of tasks to be rendered.

In another approach, a customization page might be rendered whereby the administrator is presented with selectable keywords, as defined in one or more pages for which this administrator is an authorized user, to assist the administrator in choosing filtering criteria that can be used to limit the entries in a navigation page to a useful subset.

As has been demonstrated, the present invention defines advantageous techniques for creating and deploying administration consoles. Techniques disclosed herein may be used in a variety of scenarios to provide aggregated content, and a number of such scenarios have been depicted in the examples presented herein. Portlets rendered when using embodiments of the present invention may perform operations that include, but are not limited to, querying resources and/or altering the state of those resources (where the state may be altered, for example, by issuing commands to a resource, such as starting or stopping one or more servers or other devices).

A number of different resources have been discussed herein, by way of illustration but not of limitation. Embodiments of the present invention may be used advantageously with an arbitrarily-wide range of objects, limited only by the availability of computer-accessible management interfaces for those objects.

Prior art portal and portlet techniques enable constructing a view that presents a single instance of a managed resource within a particular area of the console. Techniques of the present invention, on the other hand, enable each area of the console to represent more than one managed resource, as has been described.

Prior art consoles known to the inventors suffer drawbacks of the type which have been discussed earlier. For example, the prior art consoles are typically "installed consoles" and are not user-customizable, and disadvantages thereof have been discussed. In addition, some prior art consoles are operating-system specific and/or do not leverage standards-based interfaces. As a result, code that is developed for these consoles is often not portable, and the prior art console may therefore be very limited in its adaptability. As a result, development and maintenance costs are increased in this prior art approach, as contrasted to the reusable console modules (which may be combined in different ways for different views) made possible when using the present invention.

Consoles based on a pluggable model are commercially available that use the Microsoft Management Console ("MMC") from Microsoft Corporation, and allow independently-developed management content to be snapped in. However, these consoles are operating-system specific and operate as installed consoles. To the best of the present inventors' knowledge and belief, such consoles do not allow end users or system integrators to rearrange the content in solution-specific ways.

WebSphere Systems Console ("WSC"), a commercially-available product of IBM, provides a Web- and J2EE-based console, but techniques disclosed herein go considerably further in terms of extensibility and flexibility. For example, content modules added to WSC allow attaching tasks at various points in the console using an extended Eclipse plug-in model. Although WSC allows extension console modules to be installed and uninstalled to form a solution, the module install/uninstall cannot be performed while the console application is running (i.e., dynamically, as is possible in the present invention). Furthermore, WSC does not enable end users or system integrators to rearrange content in completely new ways. In addition, an embodiment of the present invention may provide a console that has, within the same display infrastructure, content from other end user applications which are not related to administration. For example, a user may configure his or her administration console to also contain a view of real-time stock quotes (or other user-selected content) when using the present invention. No prior art consoles are known that provide this degree of flexibility and adaptability.

The IBM Console, a commercially-available component included in several products of IBM, is a proprietary (i.e., non-standards-based) approach to an integrated console, and provides an integrated user experience across product boundaries with the intent of consolidating content and providing tighter integration between products along with a consistent user interface. This IBM Console aims to let users accomplish tasks without having to interact with many consoles, products, or servers directly. However, this IBM Console does not enable aggregating content onto a single page, and does not enable end users or system integrators to rearrange content in completely new ways, in contrast to the present invention. Furthermore, the IBM Console does not provide a solution based upon industry standards, in contrast to an embodiment of the present invention.

Optionally, an embodiment of the present invention may be adapted for generating the console as either a Web-based console or an installed console (where this decision may be made, for example, by interrogating the value of a configured parameter).

As will be appreciated by one of skill in the art, embodiments of techniques of the present invention may be provided as methods, systems, or computer program products. Preferably, an implementation of techniques of the present invention is provided in software, although implementations provided in hardware or firmware, or combinations of software with hardware and/or firmware, are also within the scope of the present invention. Furthermore, an implementation of techniques of the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A system for building an administration console as a network-accessible application in a networking environment, comprising:

a computer comprising a processor; and instructions stored on at least one computer-readable medium, wherein the processor is adapted to carry out the instructions, the instructions configured to implement functions comprising:

for each of a plurality of resources to be administered using the administration console, programmatically and dynamically tailoring the administration console to the plurality of resources to be administered therewith, further comprising:

responsive to deployment of each one of the resources in the networking environment, programmatically plugging in, to a content aggregation framework for building the administration console while the content aggregation framework is executing, at least one console module comprising functionality for administering that one of the resources in the networking environment; and responsive to undeployment of any one of the resources in the networking environment, programmatically unplugging, from the content aggregation framework while the content aggregation framework is executing, each console module previously plugged in to the content aggregation framework for that one of the resources;

for each of the programmatically plugged in console modules, dynamically adding, to a navigation pane in a view rendered in a displayed page of the administration console, each of at least one selectable entry associated with that console module, wherein the selectable entries in the navigation pane are defined in a markup language document corresponding to each of the plugged-in console modules and represent selectable links to tasks that are invocable for administering the resources to be administered with the administration console; and responsive to selection of one of the selectable entries in the navigation pane, invoking the corresponding task and rendering a view, on the administration console, comprising content created responsive to the invoked task, according to layout information associated with the selected entry by the console module with which the selected entry is associated.

2. The system according to claim 1, the instructions further configured to implement functions comprising suppressing the programmatically adding for any one of the at least one selectable entries for which a run-time lookup determines that an invocable implementation thereof is not available, thereby preventing an attempt to invoke that one of the at least one selectable entries.

3. The system according to claim 1, wherein the content aggregation framework is a portal and the selectable entries correspond to portlets.

4. A computer program product for building an administration console as a network-accessible application in a networking environment, the computer program product embodied on one or more non-transitory computer-readable storage media and comprising computer-readable program code for:

for each of a plurality of resources to be administered using the administration console, programmatically and dynamically tailoring the administration console to the plurality of resources to be administered therewith, further comprising:

responsive to deployment of each one of the resources in the networking environment, programmatically plugging in, to a content aggregation framework for building the administration console while the content aggregation framework is executing, at least one console module comprising functionality for administering that one of the resources in the networking environment; and responsive to undeployment of any one of the resources in the networking environment, programmatically unplugging, from the content aggregation framework while the content aggregation framework is executing, each console module previously plugged in to the content aggregation framework for that one of the resources;

for each of the programmatically plugged in console modules, dynamically adding, to a navigation pane in a view rendered in a displayed page of the administration console, each of at least one selectable entry associated with that console module, wherein the selectable entries in the navigation pane are defined in a markup language document corresponding to each of the plugged-in console modules and represent selectable links to tasks that are invocable for administering the resources to be administered with the administration console; and responsive to selection of one of the selectable entries in the navigation pane, invoking the corresponding task and rendering a view, on the administration console, comprising content created responsive to the invoked task, according to layout information associated with the selected entry by the console module with which the selected entry is associated.

5. The computer program product according to claim 4, further comprising computer-readable program code for suppressing the programmatically adding for any one of the at least one selectable entries for which a run-time lookup determines that an invocable implementation thereof is not available, thereby preventing an attempt to invoke that one of the at least one selectable entries.

6. The computer program product according to claim 4, wherein the content aggregation framework is a portal and the selectable entries correspond to portlets.

* * * * *